(12) United States Patent
Uehara et al.

(10) Patent No.: US 10,828,923 B2
(45) Date of Patent: Nov. 10, 2020

(54) PRESSURE-PRINTED MATERIAL PREPARING APPARATUS

(71) Applicant: FUJI XEROX CO., LTD., Tokyo (JP)

(72) Inventors: Yasuhiro Uehara, Kanagawa (JP); Yasuo Matsumura, Kanagawa (JP); Satoshi Hiraoka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/278,964

(22) Filed: Feb. 19, 2019

(65) Prior Publication Data

US 2019/0176502 A1 Jun. 13, 2019

Related U.S. Application Data

(63) Continuation of application No. 15/437,685, filed on Feb. 21, 2017, now Pat. No. 10,507,681.

(30) Foreign Application Priority Data

Jul. 1, 2016 (JP) .................................. 2016-132053

(51) Int. Cl.
| | | |
|---|---|---|
| B41M 5/50 | (2006.01) | |
| G03G 15/00 | (2006.01) | |
| B31F 1/00 | (2006.01) | |
| B29C 65/48 | (2006.01) | |
| B42D 15/02 | (2006.01) | |

(52) U.S. Cl.
CPC ........... *B41M 5/504* (2013.01); *B29C 65/486* (2013.01); *B31F 1/0009* (2013.01); *B31F 1/0025* (2013.01); *B31F 1/0051* (2013.01); *G03G 15/6541* (2013.01); *B42D 15/02* (2013.01); *G03G 2215/00835* (2013.01); *G03G 2215/00877* (2013.01)

(58) Field of Classification Search
None
See application file for complete search history.

(56) References Cited

U.S. PATENT DOCUMENTS

| | | | | |
|---|---|---|---|---|
| 2005/0092440 A1* | 5/2005 | Lindsay | ............... | B65H 45/144 156/442.1 |
| 2013/0051886 A1* | 2/2013 | Watanabe | .............. | B65H 37/04 399/409 |
| 2017/0185024 A1* | 6/2017 | Endo | ....................... | B65H 29/52 |

FOREIGN PATENT DOCUMENTS

| | | |
|---|---|---|
| JP | 09-104849 A | 4/1997 |
| JP | 2008137362 A * | 6/2008 |
| JP | 2008-155412 A | 7/2008 |

(Continued)

*Primary Examiner* — Barbara J Musser
(74) *Attorney, Agent, or Firm* — Sughrue Mion, PLLC

(57) ABSTRACT

A pressure-printed material preparing apparatus includes an attachment unit that attaches, powder which exhibits adhesiveness when pressure is applied, to a surface to be bonded of a recording medium; a fixation unit that applies pressure to the recording medium to which the powder is attached to fix the powder to the recording medium as an adhesive layer; a folding unit that folds the recording medium of which the adhesive layer is formed on the surface to be bonded, such that two portions of the surface to be bonded are opposed to each other; and an application unit that applies pressure to the recording medium in which the surfaces to be bonded are opposed to each other, to thereby bond the adhesive layer on one surface and the adhesive layer on the other surface.

9 Claims, 19 Drawing Sheets

(56) References Cited

FOREIGN PATENT DOCUMENTS

| JP | 2014-002366 A | 1/2014 |
|---|---|---|
| JP | 2014-186055 A | 10/2014 |

* cited by examiner

PRESSURE-PRINTED MATERIAL PREPARING APPARATUS

CROSS-REFERENCE TO RELATED APPLICATIONS

This application is a continuation of U.S. application Ser. No. 15/437,685 filed Feb. 21, 2017, now U.S. Pat. No. 10,507,681, which is based on and claims priority under 35 USC 119 from Japanese Patent Application No. 2016-132053 filed Jul. 1, 2016.

BACKGROUND

Technical Field

The present invention relates to a pressure-printed material preparing apparatus.

SUMMARY

According to an aspect of the invention, there is provided a pressure-printed material preparing apparatus including:

an attachment unit that attaches, powder which exhibits adhesiveness when pressure is applied, to a surface to be bonded of a recording medium;

a fixation unit that applies pressure to the recording medium to which the powder is attached to fix the powder to the recording medium as an adhesive layer;

a folding unit that folds the recording medium of which the adhesive layer is formed on the surface to be bonded, such that two portions of the surface to be bonded are opposed to each other; and an application unit that applies pressure to the recording medium in which the surfaces to be bonded are opposed to each other, to thereby bond the adhesive layer on one surface and the adhesive layer on the other surface.

BRIEF DESCRIPTION OF THE DRAWINGS

Exemplary embodiments of the present invention will be described in detail based on the following figures, wherein.

DETAILED DESCRIPTION

Figure 1:
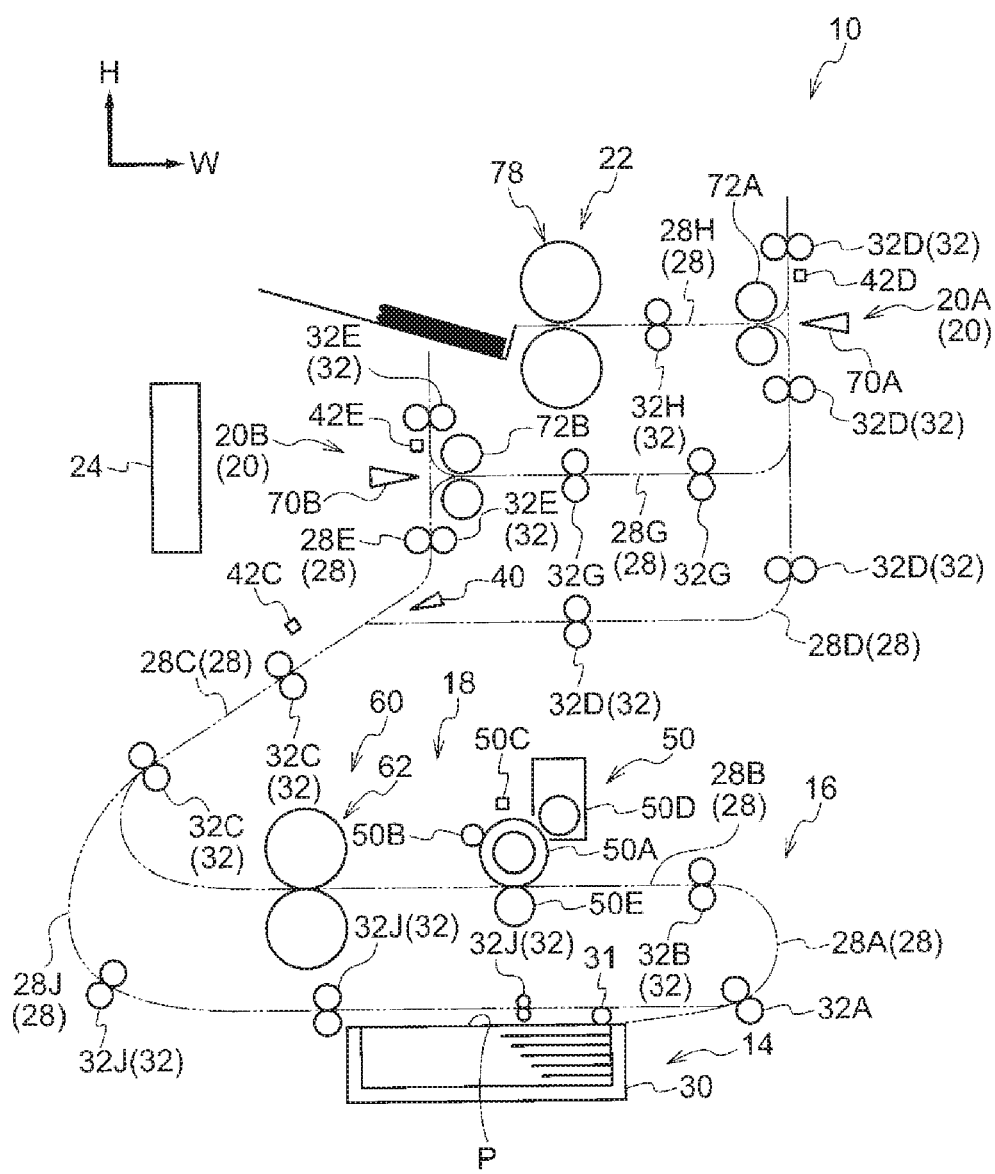
FIG. 1 is a configuration diagram showing a pressure-printed material preparing apparatus according to an exemplary embodiment.

An example of a pressure-printed material preparing apparatus according to the exemplary embodiment of the invention will be described with reference to FIGS. 1 to 19. An arrow H shown in the drawings indicates a vertical direction with respect to an apparatus (perpendicular direction) and an arrow W indicates a width direction of an apparatus (horizontal direction).

Overall Configuration

As shown in FIG. 1, a pressure-printed material preparing apparatus 10 (hereinafter, "preparing apparatus 10") according to the exemplary embodiment includes an accommodation unit 14, a transportation unit 16, a formation unit 18, a folding unit 20, and an application unit 22, from the lower side towards the upper side. The preparing apparatus 10 includes a control unit 24.

The accommodation unit 14 accommodates a sheet member P as a recording medium, and the transportation unit 16 transports the sheet member P accommodated in the accommodation unit 14. The formation unit 18 forms an adhesive layer S on the transported sheet member P, and the folding unit 20 folds the sheet member P. The application unit 22 applies pressure to the folded sheet member P, and the control unit 24 controls each unit (see FIG. 8).

Accommodation Unit

The accommodation unit 14 includes an accommodation member 30 where the sheet members P having an image formed thereon are stacked, and a sending roll 31 which sends the sheet members P stacked in the accommodation member 30 to a transportation path 28 configuring the transportation unit 16.

In this configuration, the sending roll 31 sends the sheet member P stacked in the accommodation member 30 to one side of the apparatus in the width direction of the apparatus (right side in the drawing).

Transportation Unit

The transportation unit 16 includes plural transportation rolls 32 which transport the sheet member P along the transportation path 28, and a guide member (not shown) which guides the sheet member P to be transported.

Transportation Path

The transportation path 28 includes a turning path 28A which turns back the sheet member P sent by the sending roll 31, and a horizontal path 28B on which the formation unit 18 is disposed and which extends in a horizontal direction, in the order from the upstream side of a transportation direction of the sheet member P (hereinafter, "sheet transportation direction"). The transportation path 28 includes an inclined path 28C which turns back and transports the sheet member P obliquely upward on the right side of the drawing, and a first branch path 28D and a second branch path 28E which are branched from the inclined path 28C. The transportation path 28 includes a connection path 28G which transports the sheet member P approaching the second branch path 28E to a middle position of the first branch path 28D, and a discharge path 28H which discharges the sheet member P to the outside from the first branch path 28D.

The transportation path 28 includes a reversing path 28J which switches back the sheet member P on the inclined path 28C and reverses the front and rear sides of the sheet member P. The sheet member P transported through the reversing path 28J passes through the turning path 28A again and is transported to the horizontal path 28B.

A step in which the sheet member P is transported through each transportation path 28 will be described together with operations which will be described later.

Transportation Roll

The plural transportation rolls 32 are provided. Specifically, transportation rolls 32A are disposed on the turning path 28A, transportation rolls 32B are disposed on the horizontal path 28B, transportation rolls 32C are disposed on the inclined path 28C, and transportation rolls 32D are disposed on the first branch path 28D. Transportation rolls 32E are disposed on the second branch path 28E, transportation rolls 32G are disposed on the connection path 28G, transportation rolls 32H are disposed on the discharge path 28H, and transportation rolls 32J are disposed on the reversing path 28J.

Figure 8:
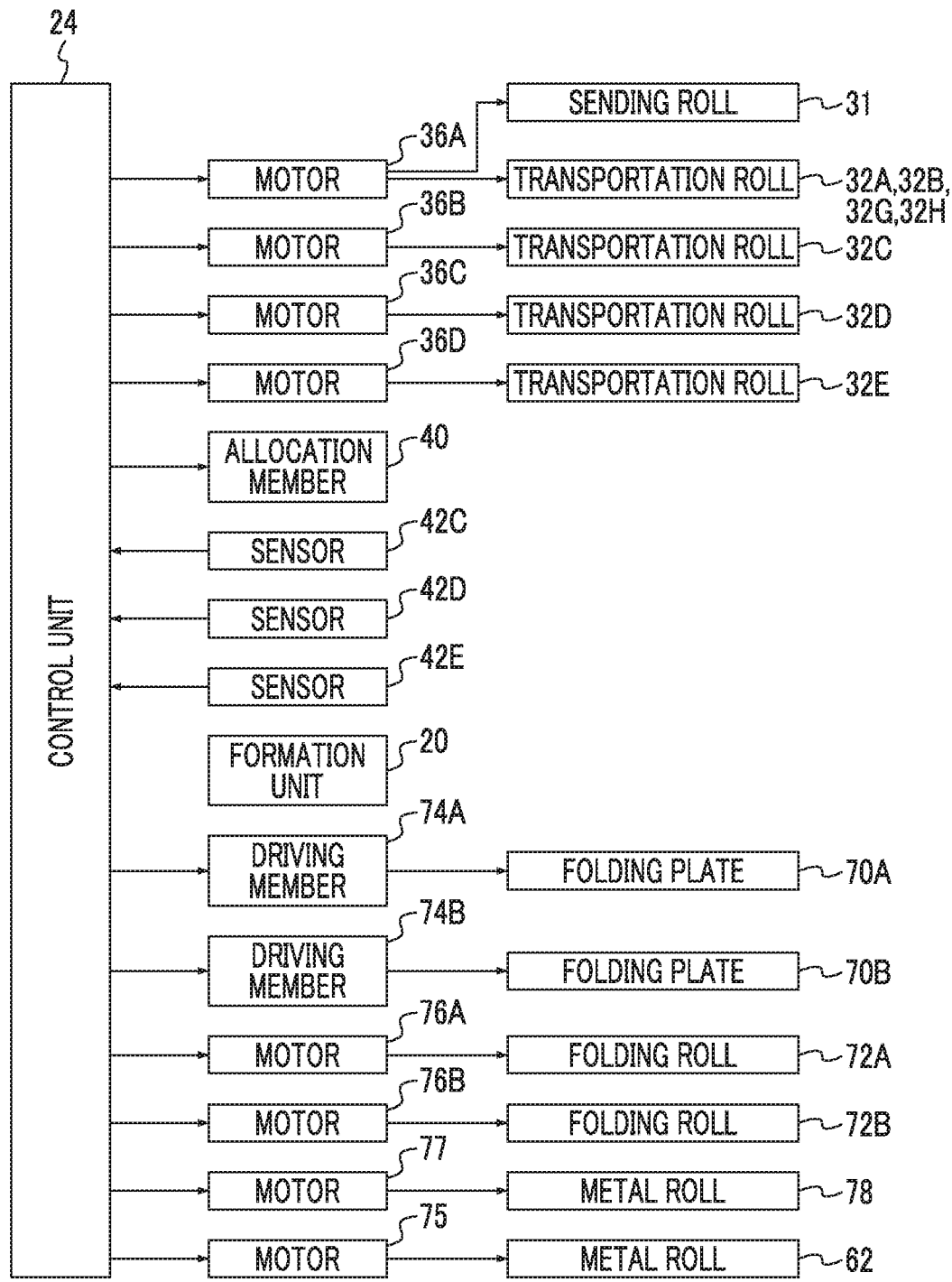
FIG. 8 is a block diagram showing a control system of a control unit of the pressure-printed material preparing apparatus according to the exemplary embodiment.

As shown in FIG. 8, the transportation unit 16 includes a motor 36A which transmits a rotation force to the sending roll 31 and the transportation rolls 32A, 32B, 32G, and 32H, and a motor 36B which transmits a rotation force to the transportation roll 32C. The transportation unit 16 includes a motor 36C which transmits a rotation force to the transportation roll 32D and a motor 36D which transmits a rotation force to the transportation roll 32E.

The motors 36A, 36B, 36C, and 36D are controlled by the control unit 24.

The control of the motors 36A, 36B, 36C, and 36D performed by the control unit 24 will be described together with operations which will be described later. In the following description, with respect to the constituent elements having A, B, C, D, E, G, H, or J attached to the reference numerals, in the case where the constituent elements are not required to be distinguished, A, B, C, D, E, G, H, or J may be omitted.

Others

As shown in FIG. 1, the transportation unit 16 includes an allocation member 40 which allocates the transported sheet member P to the first branch path 28D or the second branch path 28E. The allocation member 40 is controlled by the control unit 24. The control of the allocation member 40 performed by the control unit 24 will be described together with operations which will be described later.

The transportation unit 16 includes a sensor 42C which senses the sheet member P approaching the inclined path 28C, a sensor 42D which senses the sheet member P arrived at the edge end portion of the first branch path 28D, and a sensor 42E which senses the sheet member P arrived at the edge end portion of the second branch path 28E.

A step in which the control unit 24 receives sensing information of the sensors 42C, 42D, and 42E and controls each unit will be described together with operations which will be described later.

Formation Unit

The formation unit 18 includes a transfer unit 50 as an example of an attachment unit which is disposed on the horizontal path 28B and transfers (attaches) powder (hereinafter, "powder F") exhibiting adhesiveness when pressure is applied, to the sheet member P. The formation unit 18 includes a fixation unit 60 which fixes the powder F transferred to the sheet member P to form the adhesive layer S (hereinafter, "adhesive layer S") by applying pressure to the sheet member P.

Transfer Unit

The transfer unit 50 transfers the powder F (transparent toner) to the sheet member P according to a so-called electrophotographic system, and includes a photoreceptor 50A which contacts with the horizontal path 28B and rotates, and a charging member 50B which charges the photoreceptor 50A. The transfer unit 50 includes an exposure member 50C which irradiates the charged photoreceptor 50A with exposure light and a development member 50D. The transfer unit 50 includes a transfer member 50E which is disposed on a side opposite to the photoreceptor 50A with the horizontal path 28B nipped therebetween.

In this configuration, the charging member 50B charges the surface of the rotating photoreceptor 50A to a predetermined potential, and the exposure member 50C irradiates the charged photoreceptor 50A with exposure light to form an electrostatic latent image. The development member 50D develops the electrostatic latent image with the powder F by attaching the powder F to the photoreceptor 50A. The transfer member 50E transfers the powder F on the photoreceptor 50A to the sheet member P transported between the photoreceptor 50A and the transfer member 50E (see FIG. 6A).

Fixation Unit

The fixation unit 60 is disposed on the downstream side of the transfer unit 50 in the sheet transportation direction and includes a pair of metal rolls 62 which transport the sheet member P while interposing the sheet member therebetween. The fixation unit 60 includes a motor 75 which transmits a rotation force to the metal rolls 62 (see FIG. 8).

As an example, each of the metal rolls 62 is a member obtained by performing high-frequency hardening of high-carbon chromium bearing steel material (SUJ2) having an outer diameter $\phi$ of 40 [mm] and a length of 220 [mm] and performing hard chrome plating. One metal roll 62 is pressed against the other metal roll 62 with load of 4,000

[N], and the pressure of 25 [MPa] is applied to the sheet member P nipped between the pair of metal rolls 62. The pair of metal rolls 62 transport the sheet member P at a rate of 300 [mm/s].

In this configuration, the powder F is cracked due to pressure received from the pair of metal rolls 62 and causes a plasticized flow, and an adhesiveness force is generated between the sheet member P and the powder. Accordingly, the adhesive layer S is formed on the sheet member P (see FIG. 6B).

Folding Unit

The folding unit 20 is disposed at two positions. Specifically, the preparing apparatus 10 includes a folding unit 20A which is disposed on an edge end portion of the first branch path 28D and a folding unit 20B which is disposed on an edge end portion of the second branch path 28E.

The folding unit 20A includes a folding plate 70A which extends in an apparatus depth direction, and a pair of folding rolls 72A which are disposed at a side opposite to the folding plate 70A with the first branch path 28D on a portion extending in a vertical direction.

The folding unit 20A includes a driving member 74A which moves the folding plate 70A to an opposed position (see FIG. 4A) and a proximal position (see FIG. 4B), and a motor 76A which transmits a rotation force to the pair of folding rolls 72A (see FIG. 8). The opposed position is a position where a front edge of the folding plate 70A opposes a nip portion N1 of the folding rolls 72A in the apparatus width direction and the proximal position is a position where the front edge of the folding plate 70A passes through the first branch path 28D and is adjacent to the nip portion N1.

As shown in FIG. 1, the folding unit 20B includes a folding plate 70B which extends in the apparatus depth direction, and a pair of folding rolls 72B which are disposed at a side opposite to the folding plate 70B with the second branch path 28E on a portion extending in a vertical direction.

The folding unit 20B includes a driving member 74B which moves the folding plate 70B to an opposed position (see FIG. 14A) and a proximal position (see FIG. 14B), and a motor 76B which transmits a rotation force to the pair of folding rolls 72B (see FIG. 8). The opposed position is a position where a front edge of the folding plate 70B opposes a nip portion N2 of the folding rolls 72B in the apparatus width direction and the proximal position is a position where the front edge of the folding plate 70B passes through the second branch path 28E and is adjacent to the nip portion N2.

In this configuration, although the details will be described later, the folding units 20A and 20B fold the sheet member P so that the adhesive layer S formed on the sheet member P comes contacts with the other adhesive layer S formed on the sheet member P.

The control of the driving members 74A and 74B and the motors 76A and 76B performed by the control unit 24 will be described together with operations which will be described later.

Application Unit

As shown in FIG. 1, the application unit 22 is disposed at an edge end portion of the discharge path 28H and includes a pair of metal rolls 78 and a motor 77 which transmits a rotation force to the metal rolls 78 (see FIG. 8).

As an example, each of the metal rolls 78 is a member obtained by performing high-frequency hardening of high-carbon chromium bearing steel material (SUJ2) having an outer diameter ϕ of 100 [mm] and a length of 220 [mm] and performing hard chrome plating. Rolls having a larger diameter than that of the fixation unit 60 are employed, by considering biting properties of the sheet member P, because the folded thick sheet member P passes through the rolls.

One metal roll 78 is pressed against the other metal roll 78 with load of 10,000 [N], and the pressure of 20 [MPa] is applied to the sheet member P nipped between the pair of metal rolls 78. The pair of metal rolls 78 transport the sheet member P at a rate of 300 [mm/s].

In this configuration, a plasticized flow occurs due to the pressure again and two portions of the adhesive layer S are bonded to each other.

Powder

As the powder F to be used in the exemplary embodiment, a powder which exhibits a plastic behavior with respect to pressure is preferably used, and such powder may be selected from known powders. More preferably, powder satisfying the following Expression (1) may be used.

$$20° \text{ C.} \leq T(1 \text{ MPa}) - T(10 \text{ MPa}) \qquad \text{Expression (1)}$$

In Expression (1), T(1 MPa) represents a temperature at which the powder has a viscosity is $10^4$ Pa·s with an applied pressure of 1 MPa in a measurement by a flow tester, and T(10 MPa) represents a temperature at which the powder has a viscosity of $10^4$ Pa·s with an applied pressure of 10 MPa in a measurement by a flow tester.

Hereinafter, "First Exemplary Embodiment" and "Second Exemplary Embodiment" will be described regarding the powder (so-called baroplastic) as an example.

First Exemplary Embodiment

It is preferable that the powder (adhesive material) according to the exemplary embodiment includes at least two kinds of resins (hereinafter referred to as "binder resins") having different glass transition temperatures (Tg), in order to easily exhibit plastic behaviors, when the pressure is applied. In a case where the powder according to the exemplary embodiment includes at least the two kinds of resins, the powder easily forms a phase-separated structure. Accordingly, it is thought that the powder easily exhibits fluidity with a pressure equal to or greater than predetermined pressure, and excellent pressure fixing performance is easily exhibited.

In a case where the powder according to the exemplary embodiment includes three or more kinds of resins, glass transition temperatures of at least two kinds of resins, among the three or more kinds of resins, may be different from each other.

With respect to the resins includes in the powder which is preferably used, the glass transition temperatures of the two kinds of resins are preferably different from each other by 30° C. or higher and more preferably different from each other by 35° C. or higher. When the glass transition temperatures of the two kinds of resins are different from each other by 30° C. or higher, the powder including the two kinds of resins is more easily fixed with a lower pressure.

The powder may include three or more kinds of resins, and in this case, two kinds thereof preferably satisfy the relationship described above.

A content of a resin having a high glass transition temperature among the two kinds of resins is preferably 5% by weight to 70% by weight, more preferably 10% by weight to 60% by weight, and even more preferably 20% by weight to 50% by weight, with respect to the total weight of the two kinds of resins. When the content of a resin having a high glass transition temperature is 5% by weight to 70% by weight, contact bonding is easily performed with a low pressure.

In a case where the powder includes a three or more of plural resins, a content of the two kinds of resins may be 80% by weight to 99% by weight and are preferably 85% by weight to 95% by weight, with respect to the total weight of the three or more of plural resins. When the content of the two kinds of resins are 80% by weight to 99% by weight, contact bonding is easily performed with a low pressure.

A glass transition temperature of at least one of the two kinds of resins having different glass transition temperatures is preferably equal to or higher than 40° C., more preferably equal to or higher than 45° C., and even more preferably equal to or higher than 50° C. When the glass transition temperature is equal to or higher than 40° C., powder having excellent preservation stability is easily obtained.

The content of a resin having a glass transition temperatures equal to or higher than 40° C. may be 5% by weight to 70% by weight and is preferably 10% by weight to 60% by weight and more preferably 20% by weight to 50% by weight, with respect to the weight of the two kinds of resins having different glass transition temperatures.

A temperature of a resin having a higher glass transition temperature among the two kinds of resins may be equal to or higher than 40° C. and is preferably equal to or higher than 40° C. and lower than 60° C. and more preferably equal to or higher than 40° C. and lower than 55° C. When the temperature is lower than 60° C., contact bonding is easily performed with pressure at normal temperature (machine temperature: 50° C. or lower).

A temperature of a resin having a lower glass transition temperature among the two kinds of resins may be lower than 10° C. and is preferably equal to or higher than −100° C. and lower than 10° C. and more preferably equal to or higher than −80° C. and lower than 10° C. When the temperature is lower than 10° C., contact bonding is easily performed with a low pressure.

The powder according to the exemplary embodiment may include three or more of plural resins, and in this case, the two kinds of resins among these satisfy a relationship that glass transition temperatures thereof are different from each other by 30° C. or higher, and the glass transition temperature of at least one resin is preferably equal to or higher than 40° C.

The aspect regarding the "two kinds of resins having different glass transition temperatures" may be applied to "two kinds of resins having different melting temperatures" and "an amorphous resin and a crystalline resin having different glass transition temperatures and melting temperatures".

The control of the glass transition temperature may be mainly performed with a density of a rigid unit such as an aromatic ring or a cyclohexane ring in amain chain of a resin. That is, when a density of a methylene group, an ethylene group, or an oxyethylene group in a main chain is high, the glass transition temperature is decreased, and when a density of an aromatic ring or a cyclohexane ring is high, the glass transition temperature is increased. When a density of a side chain such as aliphatic series is increased, the glass transition temperature is decreased. By considering these, resins having various glass transition temperatures may be obtained.

The control of the melting temperature may also be obtained with a density of a rigid unit, in the same manner.

Hereinafter, in a case where the two kinds of resins are two kinds of amorphous resins having different glass transition temperatures, an amorphous resin having a higher glass transition temperature is referred to as a "high Tg resin" and an amorphous resin having a lower glass transition temperature is referred to as a "low Tg resin".

In a case where the two kinds of resins are two kinds of crystalline resins having different melting temperatures, a crystalline resin having a higher melting temperature is referred to as a "high melting temperature resin" and a crystalline resin having a lower melting temperature is referred to as a "low melting temperature resin".

In a case where the two kinds of resins are an amorphous resin and a crystalline resin having different glass transition temperature and melting temperature and the glass transition temperature is higher than the melting temperature, the resins are referred to as a "high Tg resin" and a "low melting temperature resin", and in a case where the glass transition temperature is lower than the melting temperature, the resins are referred to as a "low Tg resin" and a "high melting temperature resin".

As an aspect in which the powder according to the exemplary embodiment includes a high Tg resin and a low Tg resin, it is preferable to provide an aspect in which a phase-separated structure, which easily exhibits a plastic behavior when pressure is applied, may be formed. Examples of the aspect include powder including a mixture including both of the high Tg resin and the low Tg resin; powder including resins in which the high Tg resin and the low Tg resin form a sea-island structure; and powder including resin particles in which the high Tg resin and the low Tg resin form a core/shell structure.

Even in a case where the powder according to the exemplary embodiment is in an aspect including the high melting temperature resin and the low melting temperature resin, an aspect including the high Tg resin and the low melting temperature resin, and an aspect including the low Tg resin and the high melting temperature resin, the powder has the same configuration as that in the aspect including the high Tg resin and the low Tg resin, except for that the kinds of resin are changed.

Hereinafter, the example of the aspect of the powder according to the exemplary embodiment will be described in detail as an example of the aspect including the high Tg resin and the low Tg resin.

Examples of a mixture including both of the high Tg resin and the low Tg resin include a resin particle dispersion in which a resin particle dispersion in which particles of the high Tg resin are dispersed and a resin particle dispersion in which particles of the low Tg resin are dispersed are mixed with each other; powder in which powder including the high Tg resin and powder including the low Tg resin are mixed with each other; and a solid material in which a solid material including the high Tg resin and a solid material including the low Tg resin are dissolved and mixed with each other.

The resin in which the high Tg resin and the low Tg resin form a sea-island structure forms a phase-separated structure in which an island phase is present in a sea phase. In the resin in which a sea-island structure is formed, the high Tg resin may be a sea phase and the low Tg resin may be an island phase, or the high Tg resin may be an island phase and the low Tg resin may be a sea phase, but it is preferable that the high Tg resin forms a sea phase and the low Tg resin forms an island phase.

The sea-island structure of the resin included in the powder is confirmed by using the following method. The powder is embedded in an epoxy resin, a slice is prepared using a diamond knife or the like, the prepared slice is dyed in a desiccator using osmium tetroxide, the dyed slice is observed with a transmission electron microscope, and the structure of the resin is confirmed. Here, the sea phase and the island phase of the sea-island structure are distinguished with shades due to the dyed extent of the resin with osmium tetroxide.

A long diameter of the island phase is preferably 150 nm or less. In a case where the high Tg resin forms the sea phase and the low Tg resin forms the island phase, it is preferable that the low Tg resin as the island phase is finely dispersed. In such a case, a diameter of the island phase is preferably 150 nm or less, more preferably from 5 nm to 150 nm, even more preferably from 50 nm to 140 nm, and particularly preferably from 100 nm to 130 nm. When the diameter of the island phase is 150 nm or less, a pressure plastic behavior is sufficiently easily exhibited, and fixation is easily performed at the time of pressure fixation. When the diameter of the island phase is 5 nm or more, an excellent sea-island structure is easily formed without mixing and dissolving the high Tg resin and the low Tg resin, and blocking occurring due to plasticization even in room temperature at which pressurization is not performed, hardly occurs.

A long diameter of the island phase may be calculated by the following method. The powder is embedded in an epoxy resin, a slice is prepared using a diamond knife or the like, and the prepared slice is observed with a transmission electron microscope. The long diameter of the island phase may be calculated by arbitrarily selecting 100 island phases observed in the slice and calculating an average long diameter using a LUZEX image analysis device.

A proportion of the weight of the resin forming the island phase with respect to the weight of the resin forming the sea phase is preferably 0.25 or more.

In order to exhibit a suitable pressure plastic behavior, for example, in a case where the high Tg resin forms the sea phase and the low Tg resin forms the island phase, a proportion of the weight of the low Tg resin is preferably 0.3 or more, more preferably 0.4 or more, and even more preferably 0.5 or more, with respect to the weight of the high Tg resin.

The proportion of the weight of the low Tg resin is preferably smaller than 1.5 with respect to the weight of the high Tg resin. When the proportion thereof is smaller than 1.5, plasticization at room temperature hardly occurs.

As a resin which may be used in formation of the sea-island structure, an addition polymerization type resin or a polycondensed resin may be used, for example.

Resin particles in which the high Tg resin and the low Tg resin form a core/shell structure are resin particles including a core (core particles) and a coating layer (shell layer) to coat the core.

As the baroplastic, a resin obtained by aggregating resin particles in which the high Tg resin and the low Tg resin form a core/shell structure, is suitably used.

The high Tg resin may form the core and the low Tg resin may form the coating layer, or the high Tg resin may form the coating resin and the low Tg resin may form the core, but it is preferable that high Tg resin forms the coating resin and the low Tg resin forms the core.

A diameter of the core is preferably 10 nm to 200 nm and more preferably 20 nm to 150 nm. A thickness of the coating layer is preferably 10 nm to 100 nm and more preferably 20 nm to 80 nm.

The core/shell structure is confirmed by the following method. The powder is embedded in an epoxy resin, a slice is prepared using a diamond knife or the like, the prepared slice is observed with a transmission electron microscope, and the structure of the resin particles is confirmed.

As a resin which may be used in formation of the core/shell structure, an addition polymerization type resin or a polycondensed resin may be used, for example.

Among these, as the high Tg resin in the sea-island structure or the core/shell structure, a resin selected from the group consisting of a polyester resin, an acrylic resin, and a styrene-acrylic resin is preferable, and a styrene-acrylic resin is more preferable, from viewpoints of contact bonding properties and peeling properties. As the low Tg resin in the sea-island structure or the core/shell structure, a resin selected from the group consisting of a polyester resin and an acrylic resin is preferable, an acrylic resin is more preferable, a resin selected from the group consisting of a n-butyl acrylate homopolymer and copolymer and 2-ethylhexyl acrylate homopolymer and copolymer is even more preferable, and a n-butyl acrylate homopolymer or a 2-ethylhexyl acrylate homopolymer is particularly preferable, from viewpoints of contact bonding properties and peeling properties.

Second Exemplary Embodiment

It is preferable that the powder according to the exemplary embodiment includes a resin having two segments having different glass transition temperatures in one molecule, in order to easily exhibit plastic behaviors when the pressure is applied. In a case where the powder according to the exemplary embodiment includes the resin, the powder easily forms a phase-separated structure. Accordingly, it is thought that the powder easily exhibits fluidity with a pressure equal to or greater than predetermined pressure, and excellent pressure fixing performance is easily exhibited.

With respect to the resin having two segments having different glass transition temperatures in one molecule, the two glass transition temperatures are preferably different from each other by 30° C. or higher and more preferably different from each other by 50° C. or higher, in order to easily bond the powder with a lower pressure.

In a case where the resin has two segments having two glass transition temperatures in one molecule, the resin is preferably a block copolymer or a graft copolymer having two segments having different glass transition temperatures. In this case, a segment having a higher glass transition temperature is referred to as a "high Tg segment" and a segment having a lower glass transition temperature is referred to as a "low Tg segment".

A proportion of the high Tg segment of the resin is preferably 5% by weight to 70% by weight and more preferably 10% by weight to 60% by weight. When the proportion of the high Tg segment thereof is 5% by weight to 70% by weight, contact bonding is easily performed with a low pressure and a degree of fixation of an image is hardly deteriorated.

The glass transition temperature of the resin is preferably 40° C. or more, more preferably 45° C. or more, and even more preferably 50° C. or more. When the glass transition temperature thereof is 40° C. or more, powder having excellent preservation stability is easily obtained.

With respect to the block copolymer, any linking mode of the constitutional segments may be adopted, as long as a plastic behavior is exhibited when the pressure is applied.

When the high Tg segment is set as A and the low Tg segment is set as B, for example, as the block copolymer, an AB-type, ABA-type, BAB-type, (AB)n-type, (AB)nA-type, or B(AB)n-type block copolymer may be used.

In the phase-separated structure formed by the block copolymer, a thermodynamically most stable structure is present depends on the kinds of the constitutional segment and molecular weight, and generally, with respect to a copolymer formed of a C segment and a D segment, the structure only depends on a C/D composition ratio without depending on the linking format. C changes to a spherical domain and D changes to a matrix (C sphere D matrix) (sea-island), C changes to a rod-shaped domain and D changes to a matrix (cylinder), C and D change to nest (Gyroid), C and D change to a C/D alternate layer (lamella), D changes to a rod-shaped domain and C changes to a matrix (cylinder), D and C change to nest (Gyroid), D changes to a spherical domain and C changes to a matrix (D sphere C matrix) (sea-island), systematically, along an increase of the C/D ratio.

However, in a case of preparing powder according to a wet method, a phase-separated state may be arbitrarily controlled depending on a solvent used and a drying speed. For example, even when the C/D ratio is high and the D sphere C matrix structure is thermodynamically obtained, the C sphere D matrix structure may be obtained, when a solvent which is a good solvent for D and is a poor solvent for C is selected as a solvent.

When a good solvent for both of C and D is used and the solvent is rapidly removed, a phase-separated structure (modulated state) frozen in a spinodal decomposition state may be obtained. When a polymer only compatible with D is added to a copolymer in which the C/D ratio is high and the D sphere C matrix structure is thermodynamically obtained, a phase-separated structure in which C is sphere and D and the polymer only compatible with D are matrix may also be obtained.

A size of a repeating unit of the phase-separated structure formed by the block copolymer is increased with an increase in molecular weight of the block copolymer. A weight average molecular weight of the block copolymer may be suitably 3,000 to 500,000, preferably 5,000 to 400,000, and more preferably 6,000 to 300,000.

The C sphere D matrix and the D sphere C matrix indicate resin particles in which the block copolymer including the high Tg segment and the low Tg segment forms a sea-island structure or a composition including the resin particles. This sea-island structure is the same as the sea-island structure formed by the high Tg resin and the low Tg resin.

The block copolymer or the graft copolymer including the high Tg segment and the low Tg segment may take the aspect of the resin particles forming the core/shell structure. The core/shell structure is the same as the core/shell structure formed by the high Tg resin and the low Tg resin.

A preparing method of the resin particles in which the block copolymer or the graft copolymer forms the core/shell structure is a method of preparing the resin particles by preparing aggregated particles to be a core by an emulsion aggregating method, and polymerizing a monomer on the surface of the aggregated particles to form a shell layer.

As a synthesis method of the block copolymer or the graft polymer, arbitrary suitable synthesis methods disclosed in "Experimental Chemistry, fourth edition, vol. 28, Polymer Synthesis (Maruzen Publishing Co., Ltd. 1992)", "Chemistry and Industry of Macromonomers (IPC, 1990)", "Compatibility of Copolymer and Evaluation Techniques (Technical Information Institute Co., Ltd., 1992)", "Copolymer New Material One Point 12 Polymer Alloy (Kyoritsu Shuppan Co., Ltd., 1988)", "Angew. Macromol. Chem., 143, pp. 1-9 (1986)", "Journal of The Adhesion Society of Japan, 26, pp. 112-118 (1990)", "Macromolecules, 28, pp. 4893-4898 (1995)", and "J. Am. Chem. Soc., 111, pp. 7641-7643 (1989)" may be used.

As a resin used in the synthesis of the block copolymer or the graft copolymer, an addition polymerization type resin or a polycondensed resin may be used.

Temperature Characteristics of Resin

The "crystallinity" of the resin does not indicate a stepwise change in endothermic energy amount, but indicates a clear endothermic peak, in differential scanning calorimetry, and specifically, indicates that a half-value width of an endothermic peak is within 10° C., when it is measured at a rate of temperature rise of 10 (° C./min). The "non-crystallinity" of the resin indicates that a half-value width exceeds 10° C., a stepwise change in endothermic energy amount is shown, or a clear endothermic peak is not confirmed.

The glass transition temperature of the resin is determined by a DSC curve obtained by differential scanning calorimetry (DSC), and more specifically, is determined by "Extrapolated Starting Temperature of Glass Transition" disclosed in a method of determining a glass transition temperature of JIS K 7121-1987 "Testing Methods for Transition Temperature of Plastics". The melting temperature of the resin is obtained from "melting peak temperature" described in the method of obtaining a melting temperature in JIS K 7121-1987 "Testing Methods for Transition Temperatures of Plastics", from a DSC curve obtained by differential scanning calorimetry (DSC).

Hereinafter, as an example, the measurement of the glass transition temperature of powder including the high Tg resin and the low Tg resin will be described as the aspect of the powder.

In a case where the powder includes a mixture including both of the high Tg resin and the low Tg resin, the glass transition temperatures of the high Tg resin and the low Tg resin before being mixed are respectively measured.

In a case where the powder includes a resin in which the high Tg resin and the low Tg resin forms a sea-island structure, the glass transition temperatures of the high Tg resin and the low Tg resin before preparing the resin in which a sea-island structure is formed, are respectively measured.

In a case where the powder includes resin particles in which the high Tg resin and the low Tg resin form a core/shell structure (preferably, aggregated) and in a case of preparing the resin particles by an emulsion aggregating method, glass transition temperatures of the high Tg resin and the low Tg resin before preparing the resin particles, are respectively measured.

The measurement method of the melting temperature of the powder including the high melting temperature resin and the low melting temperature resin is also the same as the measurement method of the glass transition temperature of the powder including the high Tg resin and the low Tg resin, except for changing the glass transition temperature to the melting temperature. The measurement methods of the glass transition temperature and the melting temperature of the powder in combination with other resins, such as the powder including the high Tg resin and the low melting temperature resin, is also the same as the measurement method described above.

In a case where the powder includes the block copolymer or the graft copolymer including the high Tg segment and the low Tg segment, the DSC measurement of the block copolymer or the graft copolymer in the powder is performed, and the glass transition temperature derived from the high Tg segment and the glass transition temperature derived from the low Tg segment in the molecules of the block copolymer or the graft copolymer are determined from the obtained DSC curve.

The same applies to a measurement method of the glass transition temperature or the melting temperature of the powder including the block copolymer or the graft copolymer of other aspect.

Operations

Next, a step of preparing a crimped postcard Y (an example of a pressure-printed material) by folding the sheet member P in half (V folding), and a step of preparing a crimped postcard Z (an example of a pressure-printed material) by folding the sheet member P in three (Z folding) by using preparing apparatus 10 will be described. In a state where the preparing apparatus 10 is not operated, the folding plates 70A and 70B are disposed at the opposed position.

Folding in Half

Figure 9:
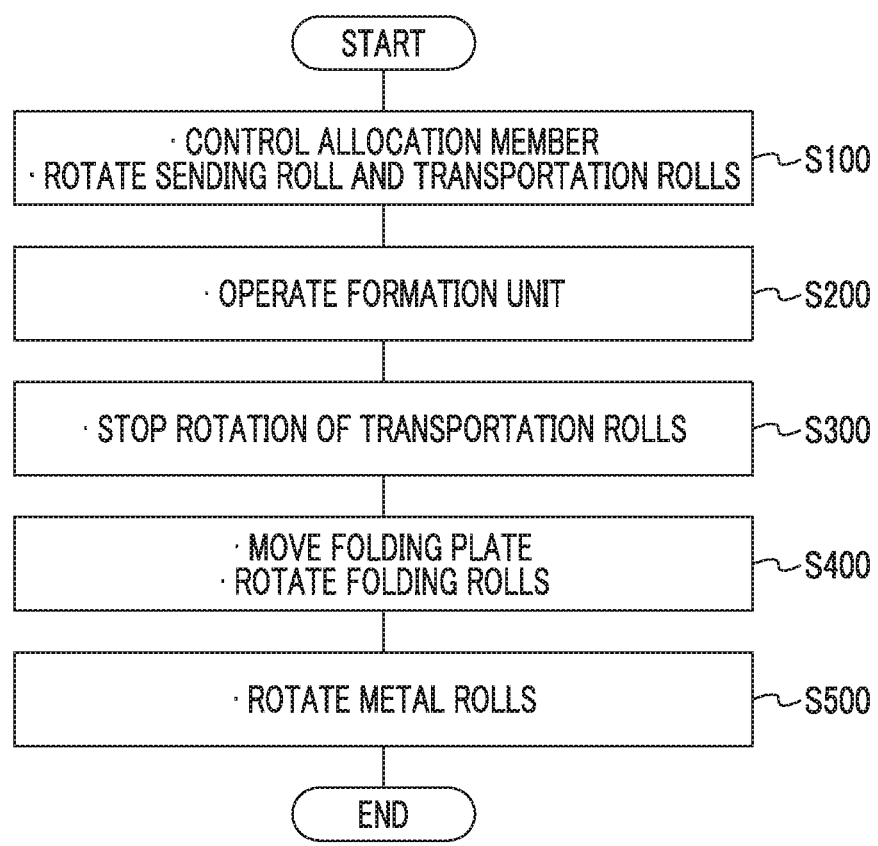
FIG. 9 is a flowchart showing a control flow of the pressure-printed material preparing apparatus according to the exemplary embodiment.

First, a step of preparing the crimped postcard Y by folding the sheet member P in half will be described with reference to the flowchart shown in FIG. 9.

Figure 7A:
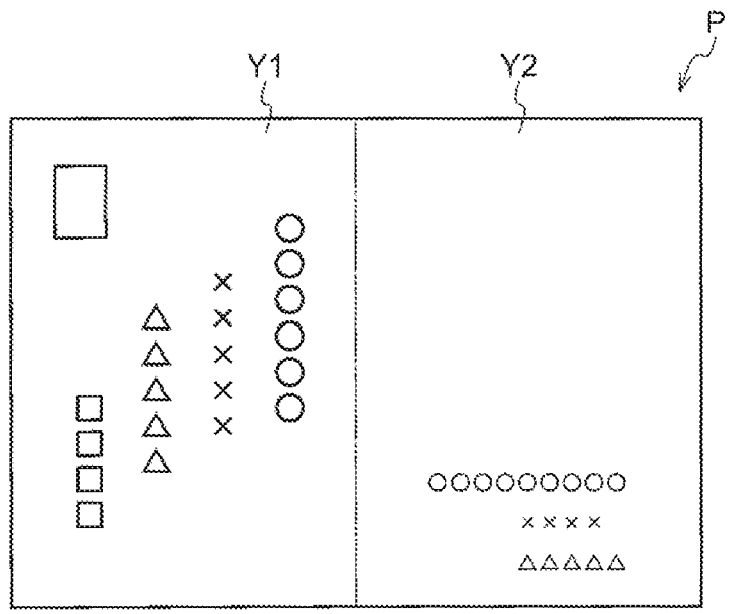
FIGS. 7A and 7B are a front view and a rear view showing the sheet member used in the pressure-printed material preparing apparatus according to the exemplary embodiment.
Figure 7B:
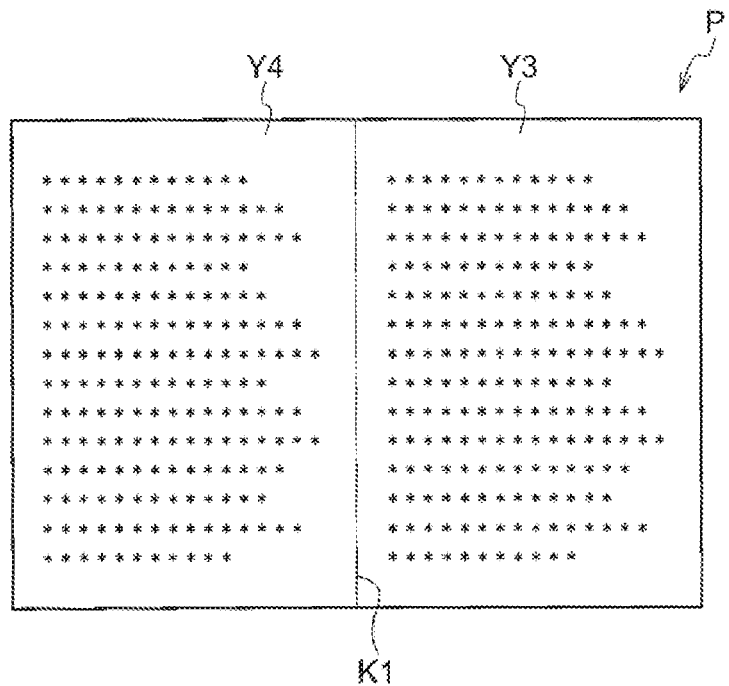

As shown in FIG. 7A, an address is printed on a front surface first portion Y1 of the sheet member P loaded on the accommodation member 30, and a sender is printed on a front surface second portion Y2 adjacent to the front surface first portion Y1. The letter having confidentiality is printed on a rear surface first portion Y3 of the sheet member P and a rear surface second portion Y4 adjacent to the rear surface first portion Y3. The rear surface first portion Y3 and the rear surface second portion Y4 are an example of a surface to be bonded. A boundary between the rear surface first portion Y3 and the rear surface second portion Y4 is set as a linear boundary portion K1.

The sheet member P is loaded on the accommodation member 30 so that the rear surface face downwards. When a user inputs the folding in half to the preparing apparatus 10 through an instruction screen (not shown) and operates the preparing apparatus 10, the process proceeds to Step S100 shown in FIG. 9.

In Step S100, the control unit 38 controls the allocation member 40 so as to introduce the transported sheet member P to the first branch path 28D. The control unit 38 controls the motor 36 to move the sending roll 31 and the transportation rolls 32 forward and transport the sheet member P to the downstream side of the sheet transportation direction. When the sheet member P is sent to the turning path 28A from the accommodation member 30, the process proceeds to Step S200.

In Step S200, the control unit 24 operates the formation unit 18 to form the adhesive layer S on the rear surface of the sheet member P.

Specifically, the charging member 50B charges the surface of the rotating photoreceptor 50A to a predetermined potential, and the exposure member 50C irradiates the charged photoreceptor 50A with exposure light and forms an electrostatic latent image corresponding to the area of the rear surface of the sheet member P. The development member 50D develops the electrostatic latent image using the powder F and attaches the powder F to the photoreceptor 50A.

Figure 2:
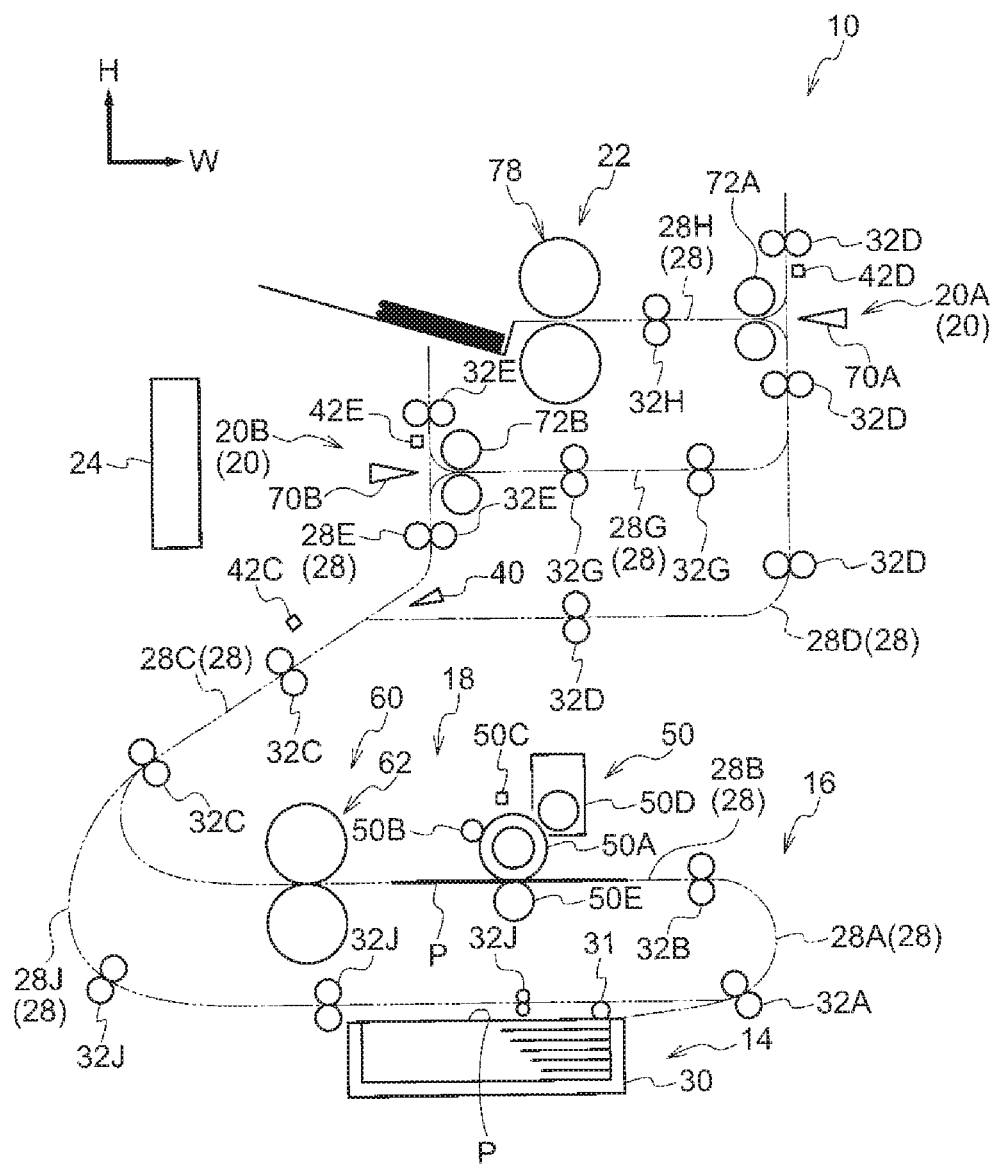
FIG. 2 is a configuration diagram showing the pressure-printed material preparing apparatus according to the exemplary embodiment.
Figure 6A:
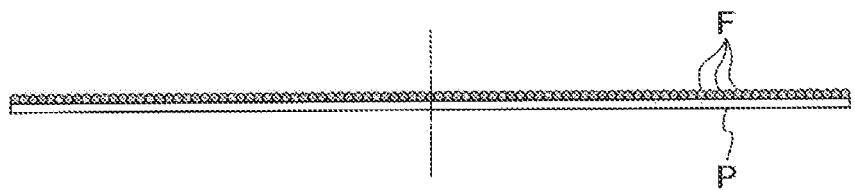
FIGS. 6A to 6C are sectional views showing a sheet member used in the pressure-printed material preparing apparatus according to the exemplary embodiment.
Figure 6B:
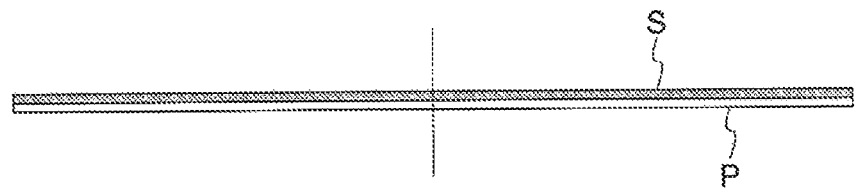
Figure 6C:
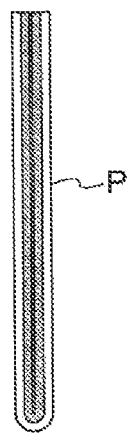

As shown in FIG. 2, when the sheet member P is transported between the photoreceptor 50A and the transfer member 50E, the transfer member 50E transfers the powder F to the rear surface (the rear surface first portion Y3 and the rear surface second portion Y4) of the sheet member P (see FIG. 6A).

The control unit 24 controls the motor 75 to rotate the metal rolls 62. The rotating metal rolls 62 interpose and transport the sheet member P to which the powder F is transferred. Accordingly, when the pressure of 25 [MPa] is applied to the sheet member P, the powder F is cracked and causes a plasticized flow, and an adhesiveness force is generated between the sheet member P and powder F. The powder F is fixed to the sheet member P as the adhesive layer S (see FIG. 6B).

The sheet member P on which the adhesive layer S is formed, passes through the inclined path 28C and approaches the first branch path 28D. When the sensor 42D senses the sheet member P, the process proceeds to Step S300.

Figure 3:
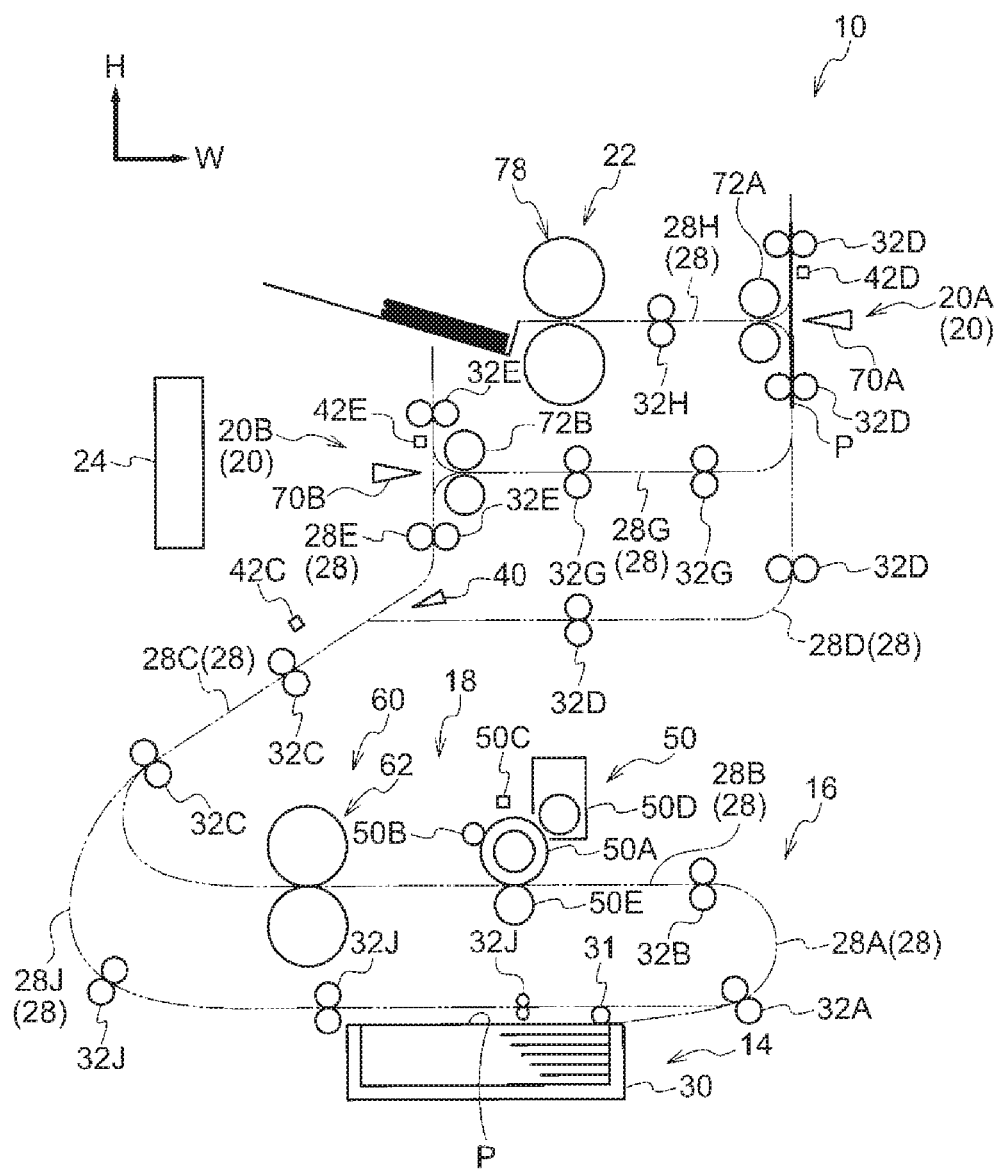
FIG. 3 is a configuration diagram showing the pressure-printed material preparing apparatus according to the exemplary embodiment.
Figure 4A:
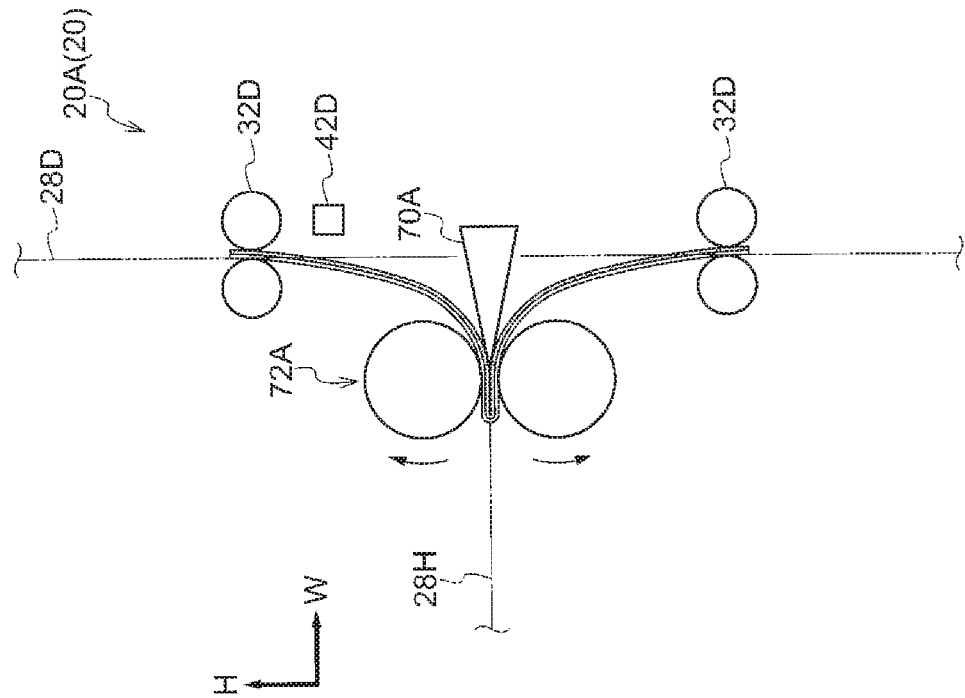
FIGS. 4A and 4B are side views showing a folding unit of the pressure-printed material preparing apparatus according to the exemplary embodiment.

In Step S300, the control unit 24 controls the motor 36C to stop the rotation of the rotating transportation rolls 32D (see FIG. 3). When the transportation rolls 32D are stopped, as shown in FIG. 4A, the sheet member P is grasped by the pair of transportation rolls 32D, and the boundary portion K1 between the rear surface first portion Y3 and the rear surface second portion Y4 of the sheet member P opposes the front edge of the folding plate 70A. When the boundary portion K1 opposes the front edge of the folding plate 70A, the process proceeds to Step S400.

Figure 4B:
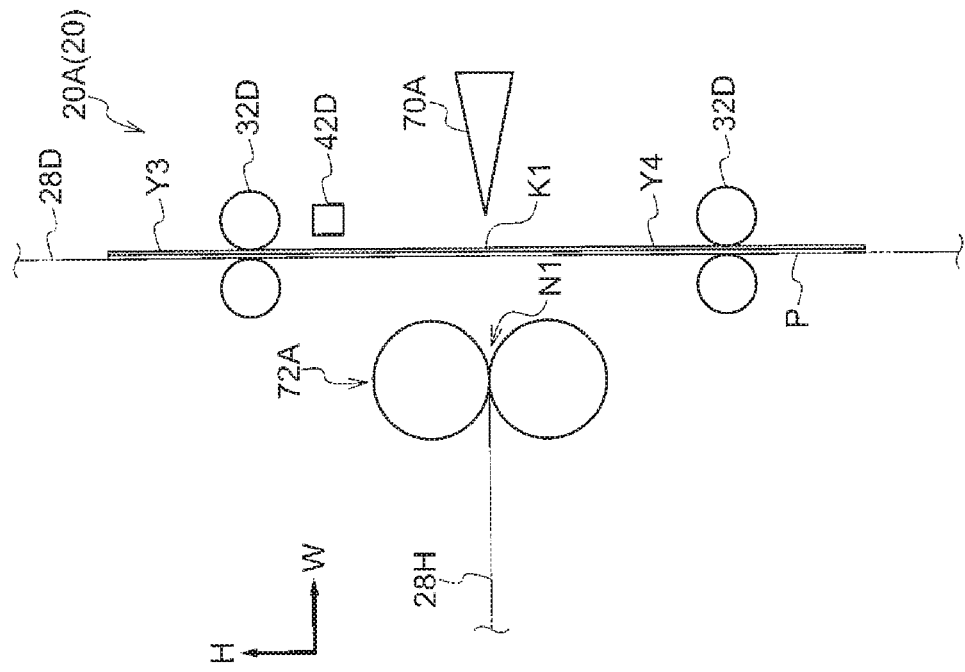
Figure 5A:
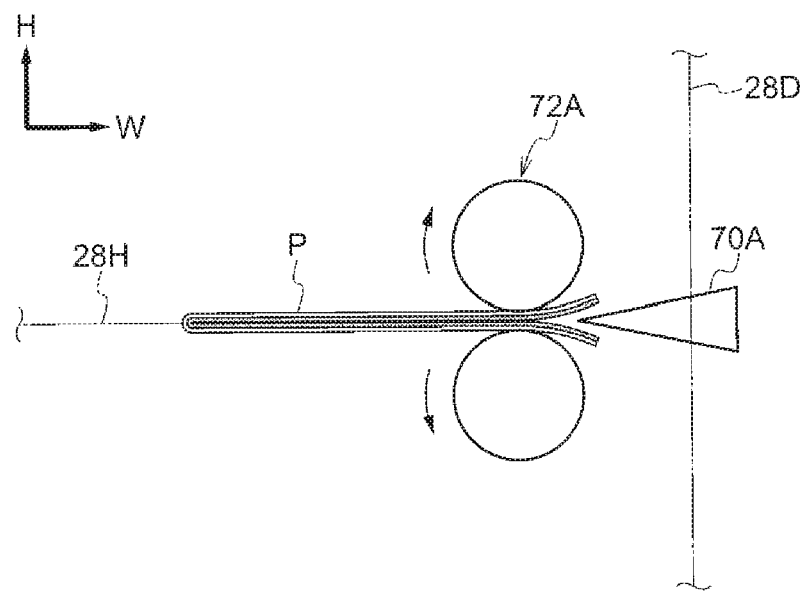
FIGS. 5A and 5B are side views showing the folding unit and an application unit of the pressure-printed material preparing apparatus according to the exemplary embodiment.

In Step S400, the control unit 24 controls the driving member 74A to move the folding plate 70A disposed on the opposed position to the proximal position. The control unit 24 controls the motor 76A to rotate the folding rolls 72A. Accordingly, as shown in FIG. 4B, the folding plate 70A folds the sheet member P by pressing the boundary portion K1 of the sheet member P with the front edge thereof. As shown in FIG. 5A, the folding rolls 72A interpose and transport the sheet member P folded by the folding plate 70A. A clutch mechanism is provided in the transportation rolls 32D and the transportation rolls are separated from the motor and rotated along the movement of the sheet member P.

When the folding plate 70A is moved to the proximal position and the folding rolls 72A interpose the sheet member P, the process proceeds to Step S500.

Figure 5B:
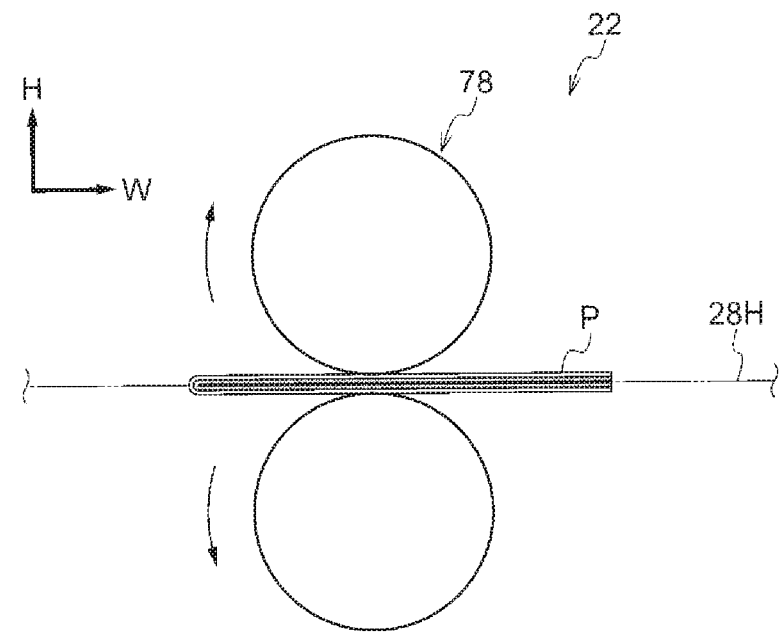

In Step S500, the control unit 24 controls the motor 77 to rotate the metal rolls 78. As shown in FIG. 5B, the rotating metal rolls 78 interpose and transport the folded sheet member P. Accordingly, when the pressure of 20 [MPa] is applied to the sheet member P, a plasticized flow occurs again and two portions of the adhesive layer S are bonded to each other.

The crimped postcard Y in which two portions of the adhesive layer S are bonded to each other is discharged, the folding plate 70A moves to the opposed position, and a series of steps ends.

Next, in a case of preparing the crimped postcard Y, the steps described above are performed again.

Folding in Three

Figure 19:
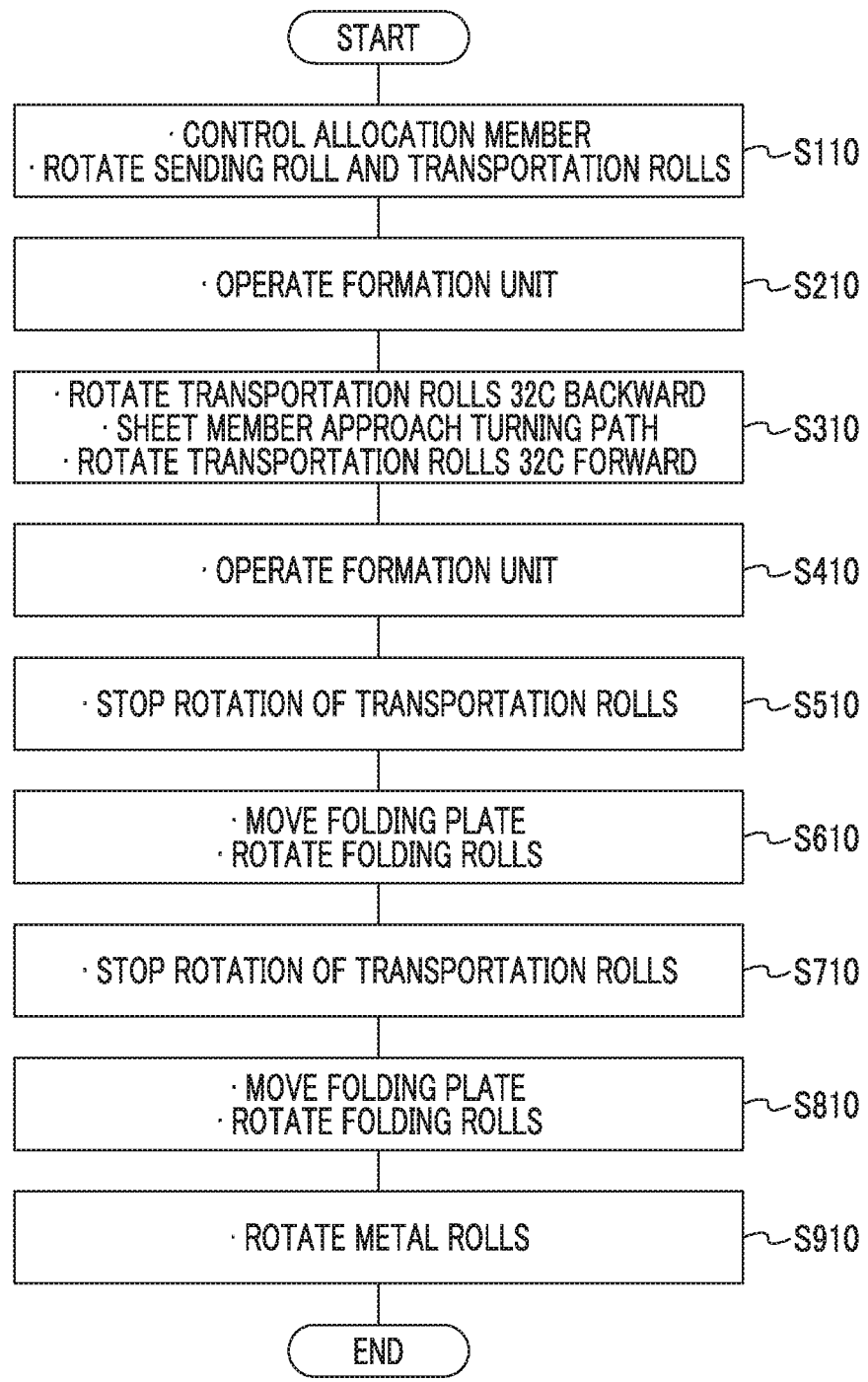
FIG. 19 is a flowchart showing a control flow of the pressure-printed material preparing apparatus according to the exemplary embodiment.

Next, a case of preparing the crimped postcard Z by folding the sheet member P in three will be described with reference to the flowchart shown in FIG. 19. A part of the step of preparing the crimped postcard Z by folding the sheet member P in three which is different from the step of preparing the crimped postcard Y by folding the sheet member in half will be mainly described.

Figure 18A:
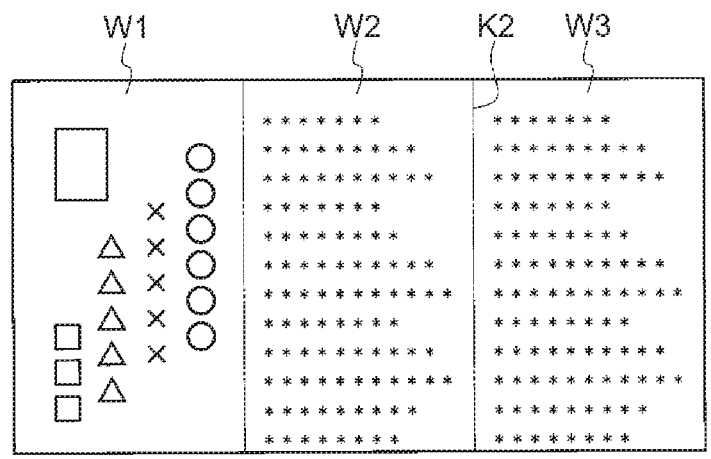
FIGS. 18A and 18B are a front view and a rear view showing the sheet member used in the pressure-printed material preparing apparatus according to the exemplary embodiment.

As shown in FIG. 18A, the front surface of the sheet member P loaded on the accommodation member 30 is divided into three regions of a front surface first portion W1, a front surface second portion W2, and a front surface third portion W3. A boundary between the front surface second portion W2 and the front surface third portion W3 is set as a linear boundary portion K2. An address is printed on the front surface first portion W1, The letter having confidentiality is printed on the front surface second portion W2 and the front surface third portion W3. The front surface second portion W2 and the front surface third portion W3 are an example of a surface to be bonded.

Figure 18B:
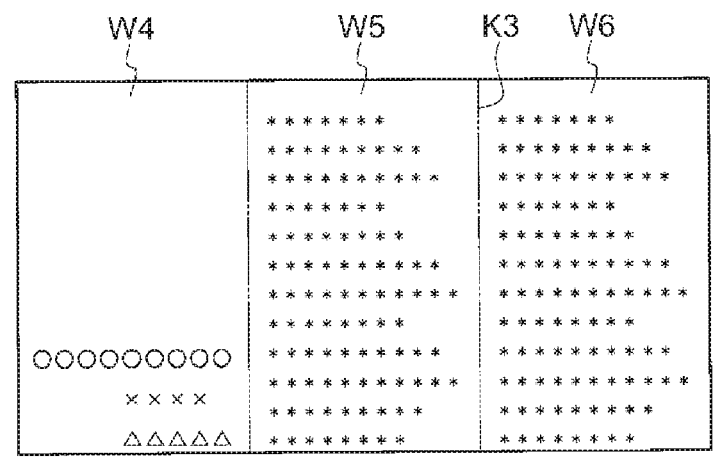

As shown in FIG. 18B, the rear surface of the sheet member P is divided into three regions of a rear surface first portion W4, a rear surface second portion W5, and a rear surface third portion W6. The rear side of the front surface third portion W3 is the rear surface first portion W4, the rear side of the front surface second portion W2 is the rear surface second portion W5, and the rear side of the front surface first portion W1 is the rear surface third portion W6. A boundary between the rear surface second portion W5 and the rear surface third portion W6 is set as a linear boundary portion K3. A sender is printed on the rear surface first portion W4, and the letter having confidentiality is printed on the rear surface second portion W5 and the rear surface third portion W6. The rear surface second portion W5 and the rear surface third portion W6 are an example of a surface to be bonded.

The sheet member P is loaded on the accommodation member 30 so that the rear surface face downwards and the front surface first portion W1 is positioned on the upstream side in the transportation direction. When a user inputs the folding in three to the preparing apparatus 10 through an instruction screen (not shown) and operates the preparing apparatus 10, the process proceeds to Step S110 shown in FIG. 19.

In Step S110, control unit 38 controls the allocation member 40 so as to introduce the transported sheet member P to the second branch path 28E. The control unit 38 controls the motor 36 to move the sending roll 31 and the transportation rolls 32 forward, in order to transport the sheet member P to the downstream side of the sheet transportation direction. When the sheet member P is sent to the turning path 28A from the accommodation member 30, the process proceeds to Step S210.

In Step S210, the control unit 24 operates the formation unit 18 to form the adhesive layer S on the rear surface second portion W5 and the rear surface third portion W6 of the sheet member P.

Specifically, the charging member 50B charges the surface of the rotating photoreceptor 50A to a predetermined potential, and the exposure member 50C irradiates the charged photoreceptor 50A with exposure light and forms an electrostatic latent image corresponding to the area of the rear surface second portion W5 and the rear surface third portion W6 of the sheet member P. The development member 50D develops the electrostatic latent image using the powder F and attaches the powder F to the photoreceptor 50A (see FIG. 2).

Figure 17A:
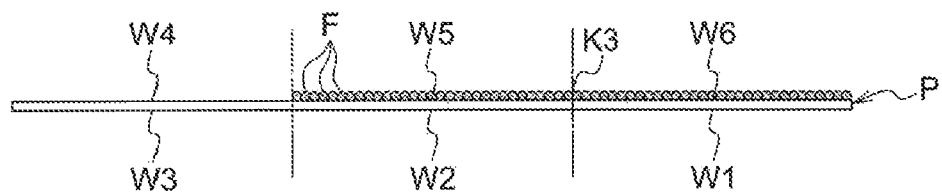
FIGS. 17A to 17D are sectional views showing the sheet member used in the pressure-printed material preparing apparatus according to the exemplary embodiment.
Figure 17B:
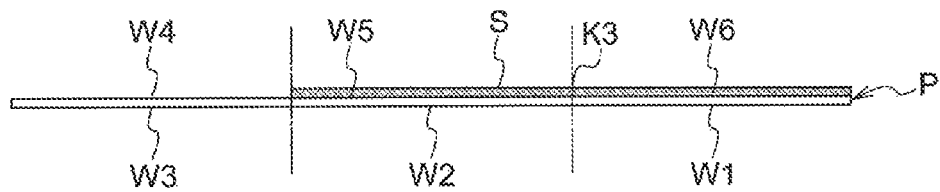

Here, when the sheet member P is transported between the photoreceptor 50A and the transfer member 50E, the transfer member 50E transfers the powder F to the rear surface of the sheet member P (see FIG. 17A).

The control unit 24 controls the motor 75 to rotate the metal rolls 62. The rotating metal rolls 62 interpose and transport the sheet member P to which the powder F is transferred. Accordingly, when the pressure of 25 [MPa] is applied to the sheet member P, the powder F is cracked and causes a plasticized flow, and an adhesiveness force is generated between the sheet member P and powder F. The powder F is fixed to the sheet member P as the adhesive layer S (see FIG. 17B).

Figure 10:
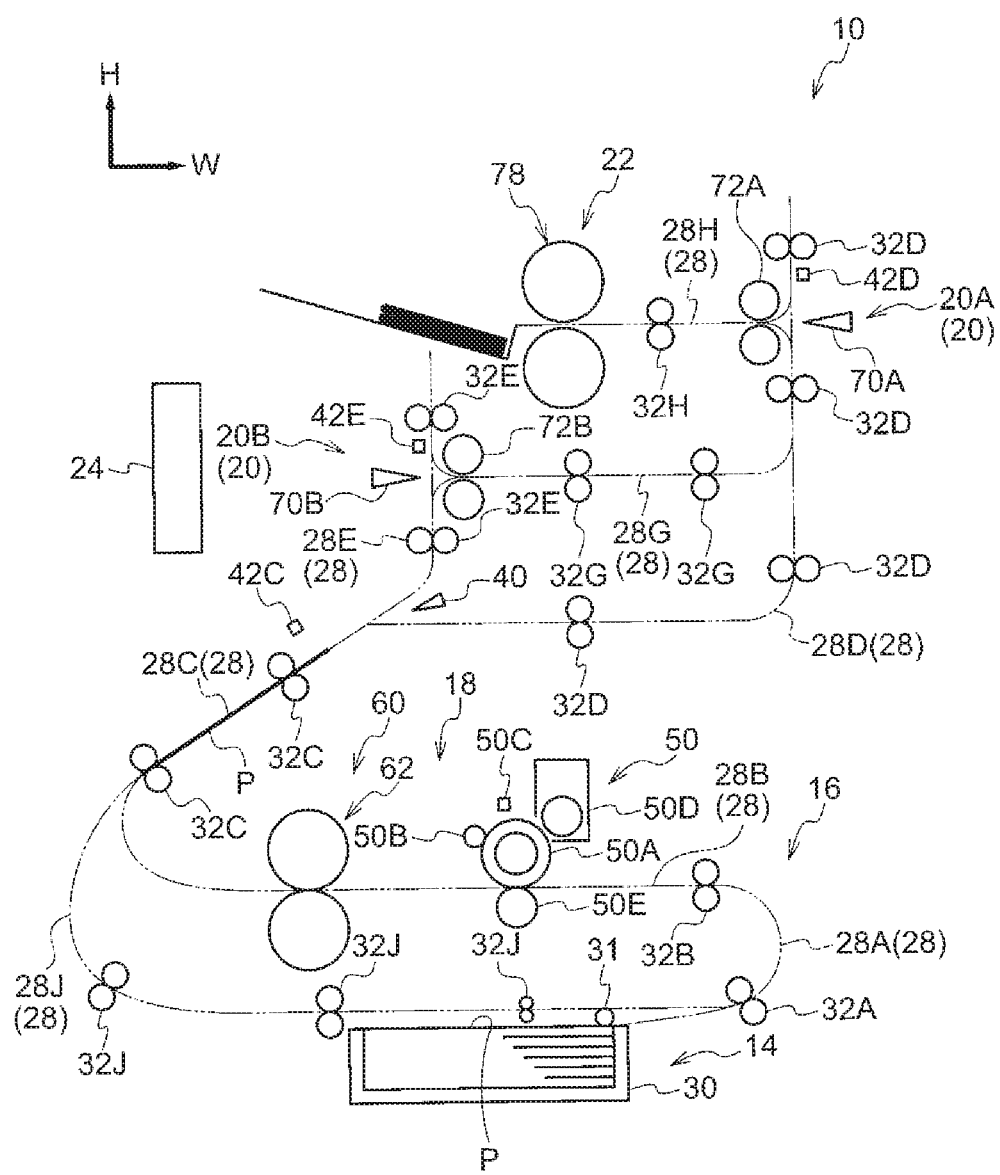
FIG. 10 is a configuration diagram showing the pressure-printed material preparing apparatus according to the exemplary embodiment.
Figure 11:
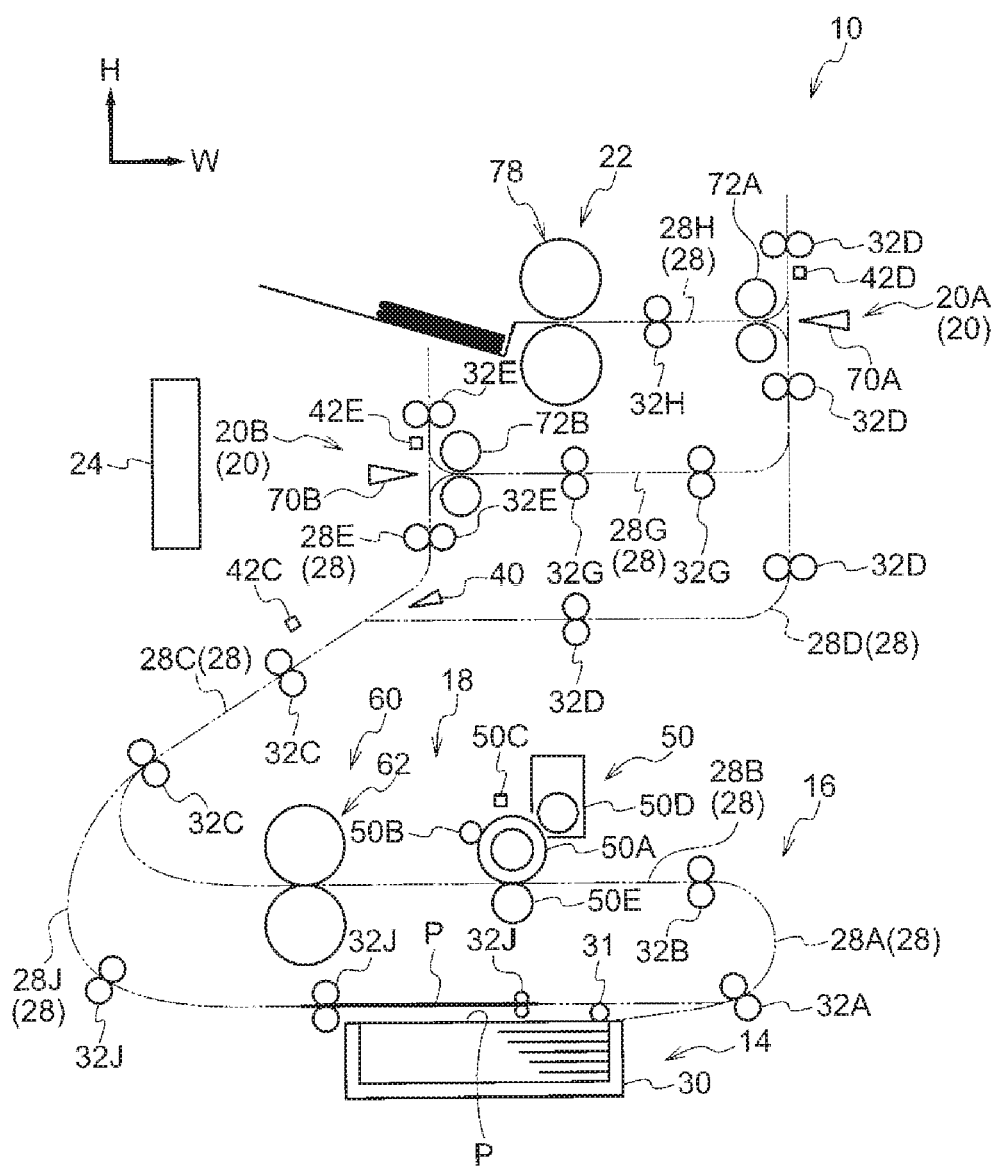
FIG. 11 is a configuration diagram showing the pressure-printed material preparing apparatus according to the exemplary embodiment.

As shown in FIG. 10, the sheet member P on which the adhesive layer S is formed, approaches the inclined path 28C. When the sensor 42C senses the sheet member P, the process proceeds to Step S310.

In Step S310, the control unit 24 controls the motor 36B to cause the transportation rolls 32C rotating forward, to rotate backward. When the transportation rolls 32C rotate backward, the sheet member P passes through the reversing path 28J so that the front and rear sides are reversed, and approaches the turning path 28A (see FIG. 11). When a regulated time has elapsed after rotating the transportation rolls 32C backward, and the sheet member P approaches the turning path 28A, the control unit 24 controls the motor 36B to cause the transportation rolls 32C rotating backward, to rotate forward. When the transportation rolls 32C rotate forward, the process proceeds to Step S410.

In Step S410, the control unit 24 operates the formation unit 18 to form the adhesive layer S on the front surface second portion W2 and the front surface third portion W3 of the sheet member P.

Specifically, the charging member 50B charges the surface of the rotating photoreceptor 50A to a predetermined potential, and the exposure member 50C irradiates the charged photoreceptor 50A with exposure light and forms an electrostatic latent image corresponding to the area of the front surface second portion W2 and the front surface third portion W3 of the sheet member P. The development member 50D develops the electrostatic latent image using the powder F and attaches the powder F to the photoreceptor 50A.

Figure 17C:
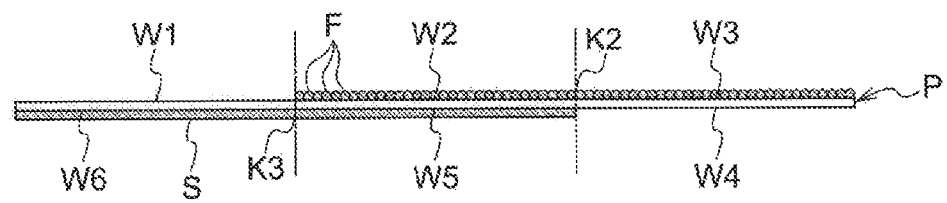
Figure 17D:
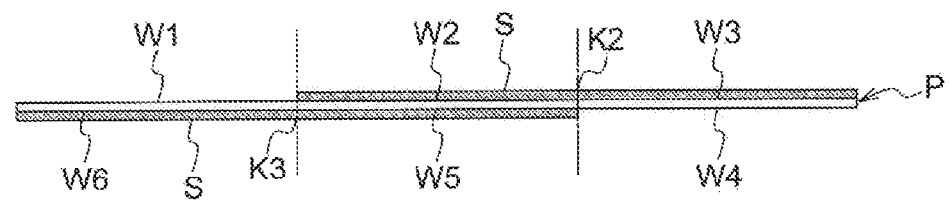

Here, when the sheet member P is transported between the photoreceptor 50A and the transfer member 50E, the transfer member 50E transfers the powder F to the front surface of the sheet member P (see FIG. 17C).

The control unit 24 controls the motor 75 to rotate the metal rolls 62. The rotating metal rolls 62 interpose and transport the sheet member P to which the powder F is transferred. Accordingly, when the pressure of 25 [MPa] is applied to the sheet member P, the powder F is cracked and causes a plasticized flow, and an adhesiveness force is generated between the sheet member P and powder F. The powder F is fixed to the sheet member P as the adhesive layer S (see FIG. 17D).

Figure 12:
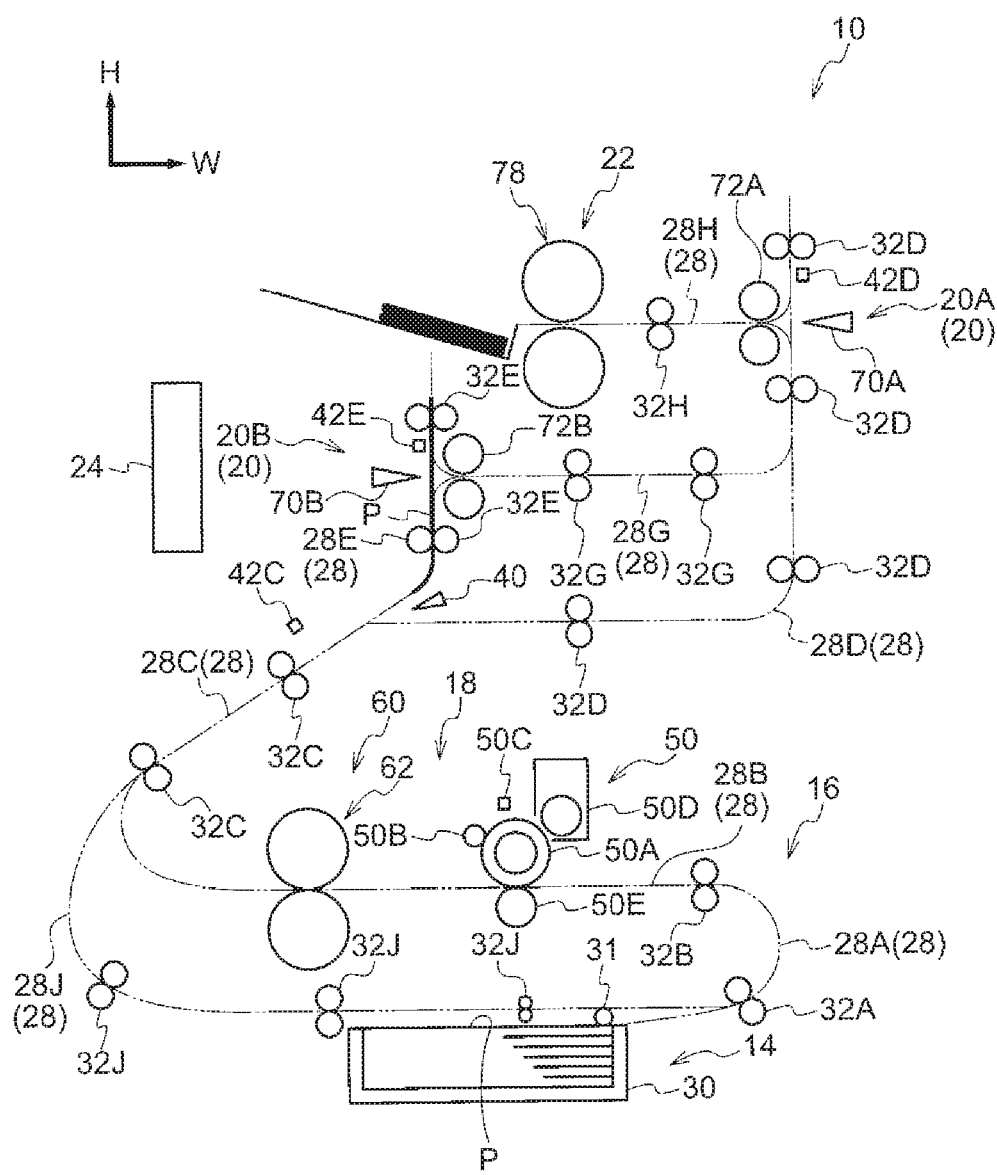
FIG. 12 is a configuration diagram showing the pressure-printed material preparing apparatus according to the exemplary embodiment.

The sheet member P on which the adhesive layer S is formed, passes through the inclined path 28C and approaches the second branch path 28E, as shown in FIG. 12. When the sensor 42E senses the sheet member P, the process proceeds to Step S510.

Figure 14A:
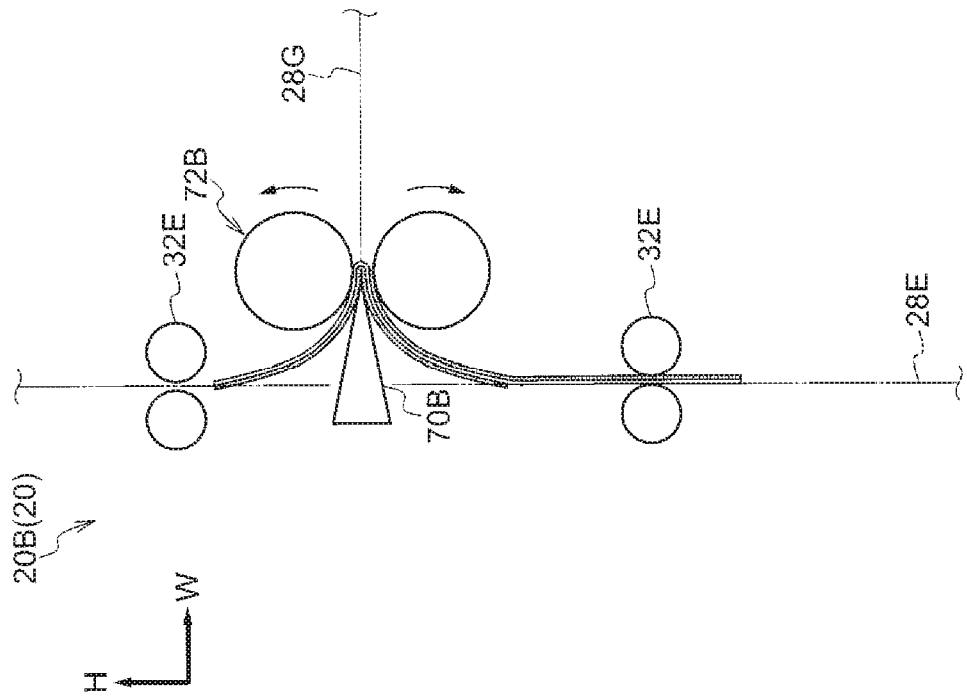
FIGS. 14A and 14B are side views showing the folding unit of the pressure-printed material preparing apparatus according to the exemplary embodiment.

In Step S510, the control unit 24 controls the motor 36D to stop the rotation of the transportation rolls 32E rotating forward. When the transportation rolls 32E are stopped, as shown in FIG. 14A, the sheet member P is grasped by the pair of transportation rolls 32E, and the boundary portion K3 between the rear surface second portion W5 and the rear surface third portion W6 of the sheet member P opposes the front edge of the folding plate 70B. When the boundary portion K3 opposes the front edge of the folding plate 70B, the process proceeds to Step S610.

Figure 14B:
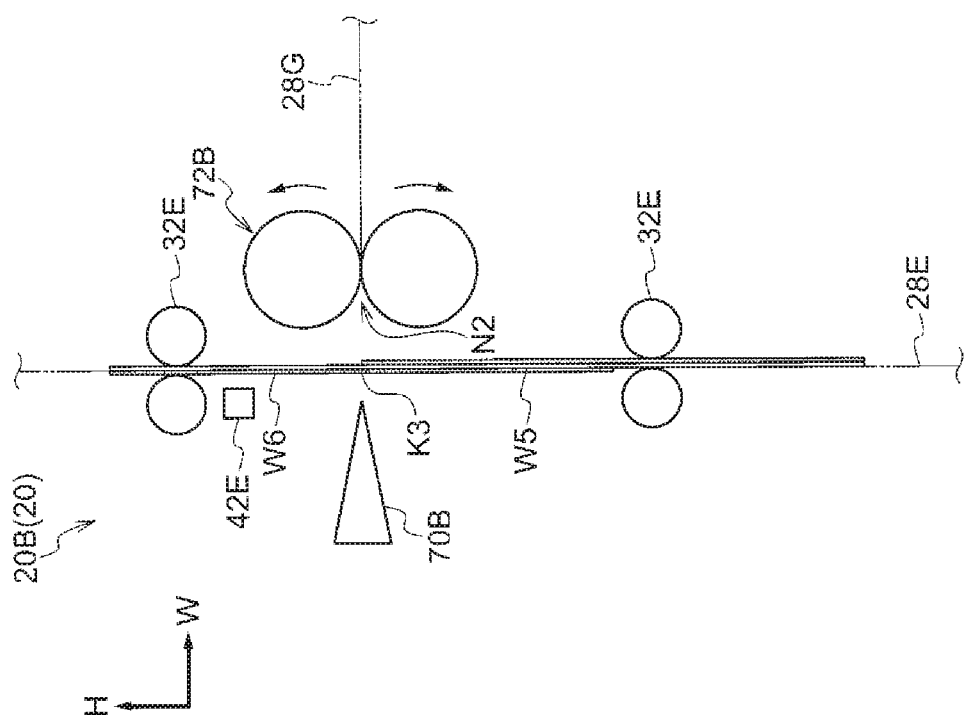

In Step S610, the control unit 24 controls the driving member 74B to move the folding plate 70B disposed on the opposed position to the proximal position. The control unit 24 controls the motor 76B to rotate the folding rolls 72B. Accordingly, as shown in FIG. 14B, the folding plate 70B folds the sheet member P by pressing the boundary portion K3 of the sheet member P with the front edge thereof. The folding rolls 72B interpose and transport the sheet member P folded by the folding plate 70B. A clutch mechanism is provided in the transportation rolls 32E and the transportation rolls are rotated along the movement of the sheet member P.

Figure 13:
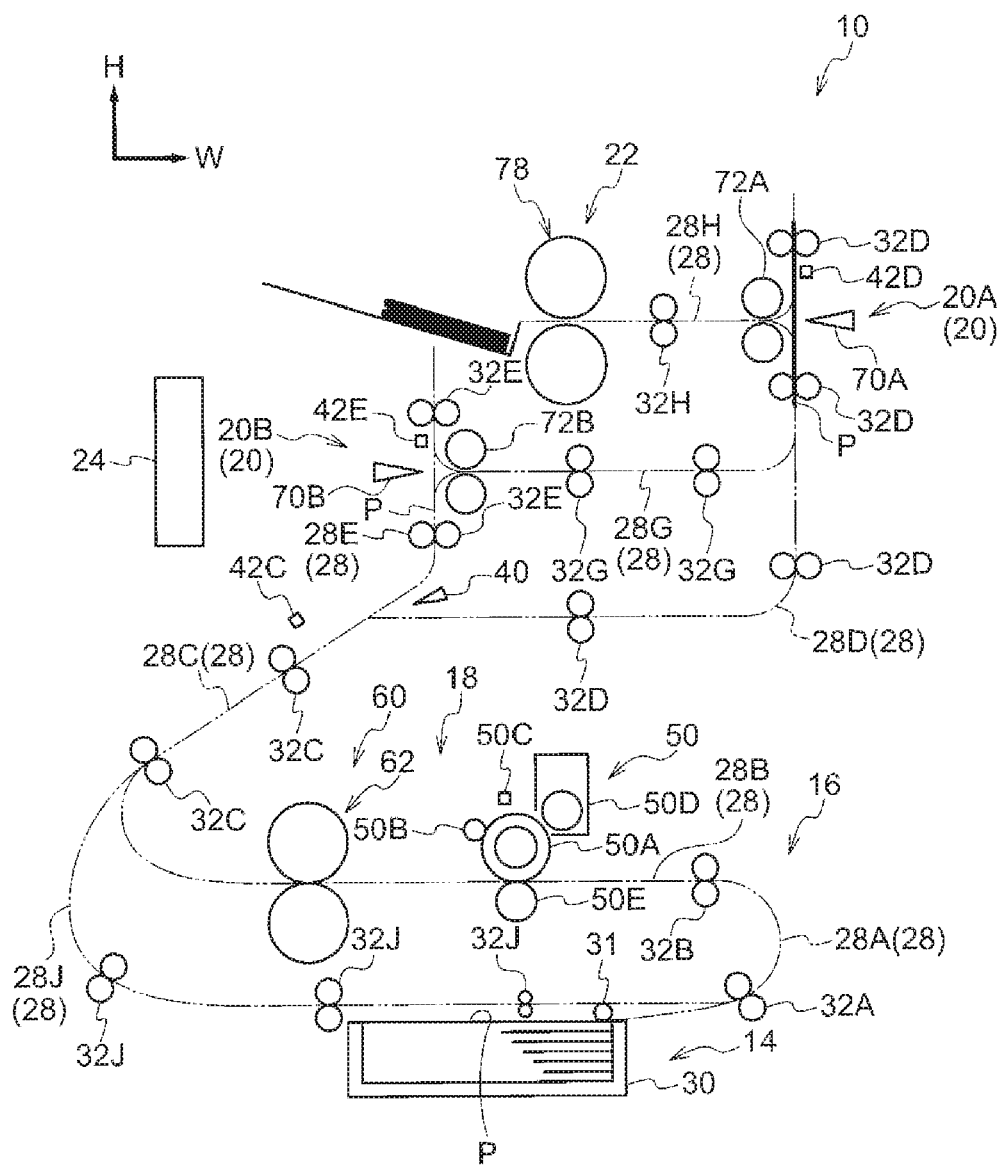
FIG. 13 is a configuration diagram showing the pressure-printed material preparing apparatus according to the exemplary embodiment.

The sheet member P folded by the folding plate 70B passes through the connection path 28G and approaches the first branch path 28D, as shown in FIG. 13. When the sensor 42D senses the sheet member P, the process proceeds to Step S710.

Figure 15B:
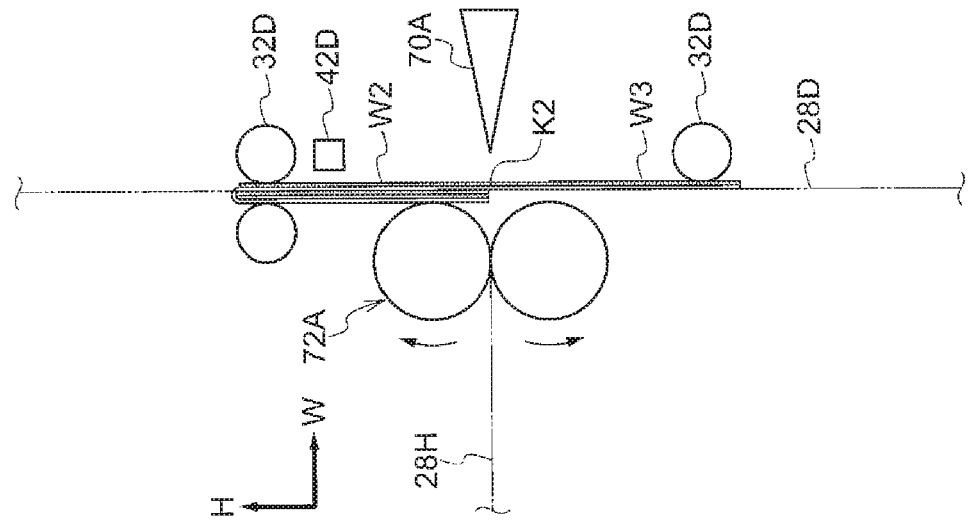
FIGS. 15A and 15B are side views showing the folding unit of the pressure-printed material preparing apparatus according to the exemplary embodiment.
Figure 15A:
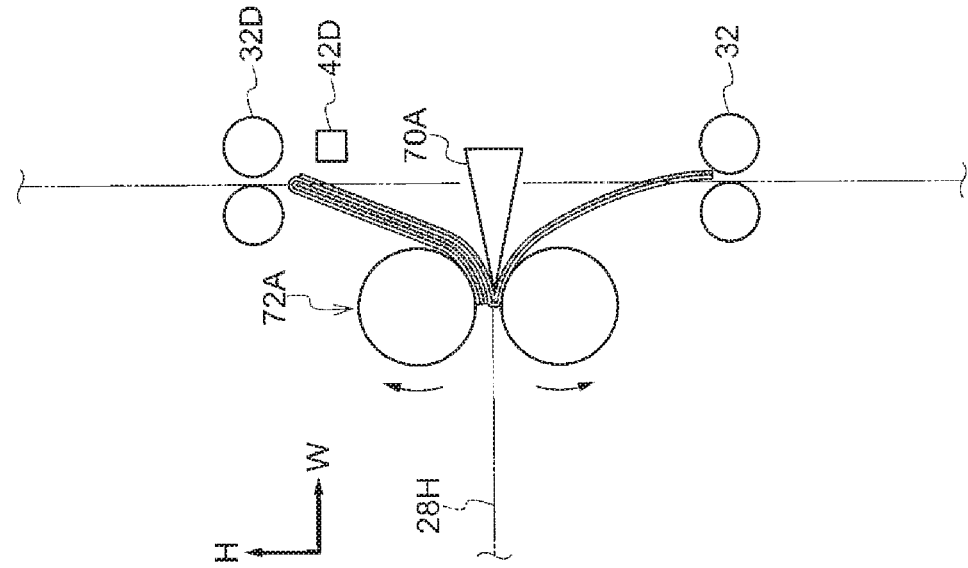

In Step S710, the control unit 24 controls the motor 36C to stop the rotation of the transportation rolls 32D rotating forward. When the transportation rolls 32D are stopped, as shown in FIG. 15A, the boundary portion K2 of the front surface second portion W2 and the front surface third portion W3 of the sheet member P opposes the front edge of the folding plate 70A. When the boundary portion K2 opposes the front edge of the folding plate 70A, the process proceeds to Step S810.

In Step S810, the control unit 24 controls the driving member 74A to move the folding plate 70A disposed on the opposed position to the proximal position. The control unit 24 controls the motor 76A to rotate the folding rolls 72A. Accordingly, as shown in FIG. 15B, the folding plate 70A folds the sheet member P by pressing the boundary portion K2 of the sheet member P with the front edge thereof. The folding rolls 72A interpose and transport the sheet member folded by the folding plate 70A.

When the folding plate 70A is moved to the proximal position and the folding rolls 72A interpose the sheet member P, the process proceeds to Step S910.

Figure 16:
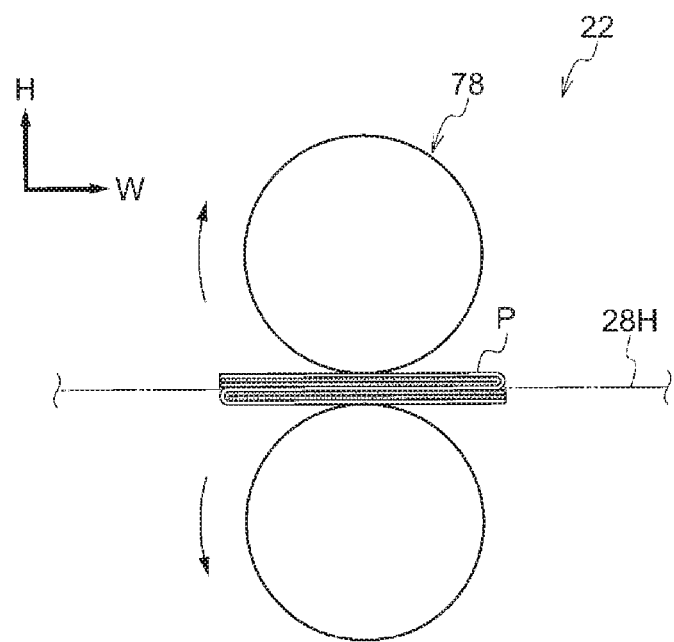
FIG. 16 is a side view showing the application unit of the pressure-printed material preparing apparatus according to the exemplary embodiment.

In Step S910, the control unit 24 controls the motor 77 to rotate the metal rolls 78. As shown in FIG. 16, the rotating metal rolls 78 interpose and transport the folded sheet member P. Accordingly, when the pressure of 20 [MPa] is applied to the sheet member P, a plasticized flow occurs again and two portions of the adhesive layer S are bonded to each other.

The crimped postcard Z in which two portions of the adhesive layer S are bonded to each other is discharged, the folding plates 70A and 70B move to the opposed position, and a series of steps ends. Next, in a case of preparing the crimped postcard Z, the steps described above are performed again.

Summary

As described above, two portions of the adhesive layer S are bonded to each other by the application unit 22 without heating the folded sheet member P.

Since two portions of the adhesive layer S are bonded to each other without heating, a high speed treatment may be performed, compared to a case where the heating is necessary.

Since two portions of the adhesive layer S are bonded to each other without heating, the cost of the apparatus decreases, compared to a case where the heating is necessary.

Since two portions of the adhesive layer S are bonded to each other without heating, the apparatus is miniaturized, compared to a case where the heating is necessary.

Since two portions of the adhesive layer S are bonded to each other without heating, the energy saving is realized, compared to a case where the heating is necessary.

Since two portions of the adhesive layer S are bonded to each other without heating, the printing of the address and the sender is not deteriorated due to heat.

Since two portions of the adhesive layer S are bonded to each other without heating, the number of options of a recording medium that may be used is increased, compared to a case where the heating is necessary. For example, in a case where an image is formed with an ink jet printer, a resin film having deteriorated heat resistance may be used.

The adhesive layer S is formed on the printed surface by the fixation unit 60, without heating the sheet member P.

In the application unit 22, the pressure of 20 [MPa] is applied to the sheet member P to bond two portions of the adhesive layer S to each other. In the fixation unit 60, the pressure of 25 [MPa] is applied to the sheet member P to form the adhesive layer S on the printed surface of the sheet member P. As described above, the pressure for forming the adhesive layer S on the printed surface is stronger than the pressure for bonding the two portions of the adhesive layer S to each other. Accordingly, when a person received the crimped postcards Y and Z opens (turns over) the printed surface, the two portions of the adhesive layer are separated from each other.

When the printed surface is opened and the two portions of the adhesive layer are separated from each other, and accordingly, scratches of the printing is prevented, compared to a case where the two portions of the adhesive layer S are not separated from each other.

By using the powder satisfying Expression (1), the two portions of the adhesive layer S are bonded to each other with a low pressure, compared to a case not satisfying Expression (1).

The invention has been described in detail with the specific exemplary embodiment, but the invention is not limited to the exemplary embodiment, and it is clear for a person skilled in the art that various other exemplary embodiments may be used within the scope of the invention. For example, in the exemplary embodiment, the powder F is attached to the sheet member P using an electrographic system, but the powder F may be attached to the sheet member P using other methods.

Although not particularly described in the exemplary embodiment, the last part of the previous step and the front part of the subsequent step may be overlapped each other in each step.

Although not particularly described in the exemplary embodiment, an intersection angle may be provided on the metal rolls 62 and 78, in order to apply suitable pressure to the sheet member P.

In the exemplary embodiment, the pressure-printed material has been described with the postcard, but other printed materials may be used.

In the exemplary embodiment, the preparing apparatus 10 includes the formation unit 18, but in a case of using the sheet member P on which the adhesive layer S is formed, the formation unit 18 is not necessary.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pressure-printed material preparing apparatus comprising:

an attachment unit configured to attach, powder which exhibits adhesiveness when pressure is applied, to a surface to be bonded of a recording medium;

a fixation unit configured to apply pressure to the recording medium to which the powder is attached to fix the powder to the recording medium as an adhesive layer; and a reversing mechanism configured to reverse a front surface and a rear surface of the recording medium to which the powder is fixed, and to convey the recording medium to the attachment unit again, wherein the reversing mechanism has a transportation path through which the recording medium is transported to a discharge path; and wherein the reversing mechanism is configured to switch back the recording medium through the transportation path and to convey the recording medium to the attachment unit again.

2. The pressure-printed material preparing apparatus according to claim 1, further comprising:

a folding unit configured to fold the recording medium of which the adhesive layer is formed on the front surface and the rear surface to be bonded in three, such that two portions of the surface to be bonded are opposed to each other; and an application unit configured to apply pressure to the recording medium in which the surfaces to be bonded are opposed to each other, to thereby bond the adhesive layer on one surface and the adhesive layer on the other surface.

3. The pressure-printed material preparing apparatus according to claim 2, wherein the reversing mechanism has a transportation path through which the recording medium is transported to the folding unit; and wherein the reversing mechanism is configured to switch back the recording medium through the transportation path and to convey the recording medium to the attachment unit again.

4. The pressure-printed material preparing apparatus according to claim 1, further comprising:

a folding unit configured to fold the recording medium of which the adhesive layer is formed on the front surface and the rear surface to be bonded in three, such that two portions of the surface to be bonded are opposed to each other; and an application unit configured to apply pressure to the recording medium in which the surfaces to be bonded are opposed to each other, to thereby bond the adhesive layer on one surface and the adhesive layer on the other surface, wherein the reversing mechanism has a transportation path through which the recording medium is transported to the folding unit; and wherein the reversing mechanism is configured to switch back the recording medium through the transportation path and to convey the recording medium to the attachment unit again.

5. The pressure-printed material preparing apparatus according to claim 1, wherein the fixation unit is configured to apply pressure to the recording medium to which the powder is attached to fix the powder to the recording medium as an adhesive layer without heating the recording medium.

6. The pressure-printed material preparing apparatus according to claim 1, wherein an image is printed on the recording medium in advance.

7. A pressure-printed material preparing apparatus comprising:

an attachment unit configured to attach, powder which exhibits adhesiveness when pressure is applied, to a surface to be bonded of a recording medium;

a fixation unit configured to apply pressure to the recording medium to which the powder is attached to fix the powder to the recording medium as an adhesive layer;

a reversing mechanism configured to reverse a front surface and a rear surface of the recording medium to which the powder is fixed, and to convey the recording medium to the attachment unit again;

a folding unit configured to fold the recording medium of which the adhesive layer is formed on the front surface and the rear surface to be bonded in three, such that two portions of the surface to be bonded are opposed to each other; and an application unit configured to apply pressure to the recording medium in which the surfaces to be bonded are opposed to each other, to thereby bond the adhesive layer on one surface and the adhesive layer on the other surface, wherein the reversing mechanism has a transportation path through which the recording medium is transported to the folding unit; and wherein the reversing mechanism is configured to switch back the recording medium through the transportation path and to convey the recording medium to the attachment unit again.

8. The pressure-printed material preparing apparatus according to claim 7, wherein the fixation unit is configured to apply pressure to the recording medium to which the powder is attached to fix the powder to the recording medium as an adhesive layer without heating the recording medium.

9. The pressure-printed material preparing apparatus according to claim 7, wherein an image is printed on the recording medium in advance.

* * * * *